(12) United States Patent
Vinckier

(10) Patent No.: US 9,350,727 B2
(45) Date of Patent: May 24, 2016

(54) SYSTEM AND A METHOD FOR VALIDATING AN IDENTIFICATION TOKEN

(71) Applicant: Gentago Services, Hoeilaart (BE)

(72) Inventor: Johan Vinckier, Hoeilaart (BE)

(73) Assignee: Gentago Services, Hoeilaart (BE)

( * ) Notice: Subject to any disclaimer, the term of this patent is extended or adjusted under 35 U.S.C. 154(b) by 0 days.

(21) Appl. No.: 14/868,820

(22) Filed: Sep. 29, 2015

(65) Prior Publication Data
US 2016/0021093 A1    Jan. 21, 2016

Related U.S. Application Data

(63) Continuation of application No. PCT/BE2014/000054, filed on Oct. 6, 2014.

(30) Foreign Application Priority Data

Oct. 4, 2013   (WO) ................ PCT/BE2013/000052
Jul. 22, 2014  (WO) ................ PCT/BE2014/000034

(51) Int. Cl.
| | | |
|---|---|---|
| H04L 29/06 | (2006.01) |
| G06F 21/31 | (2013.01) |
| G06F 21/34 | (2013.01) |
| G07C 9/00 | (2006.01) |
| H04L 29/08 | (2006.01) |

(52) U.S. Cl.
CPC .............. H04L 63/083 (2013.01); G06F 21/31 (2013.01); G06F 21/34 (2013.01); G07C 9/00031 (2013.01); H04L 67/10 (2013.01)

(58) Field of Classification Search
CPC ...... G06F 21/34; H04L 63/10; H04L 63/0853
USPC .......................................................... 726/20
See application file for complete search history.

(56) References Cited

U.S. PATENT DOCUMENTS

| | | | | |
|---|---|---|---|---|
| 5,710,874 A | * | 1/1998 | Bergen ................... | G06K 15/00 358/1.13 |
| 8,688,524 B1 | * | 4/2014 | Ramalingam .......... | G06Q 20/20 705/16 |
| 2004/0158740 A1 | * | 8/2004 | Lien ................... | G07C 9/00031 40/625 |

(Continued)

FOREIGN PATENT DOCUMENTS

| | | |
|---|---|---|
| WO | WO 2015/048859 | 4/2015 |
| WO | WO 2015/048861 | 4/2015 |

OTHER PUBLICATIONS

International Search Report, PCT/BE/2013/000052, date of mailing Mar. 5, 2014, 3 pages.
International Search Report, PCT/BE/2014/000034, date of mailing Mar. 18, 2015, 3 pages.
International Written Opinion, PCT/BE/2014/000034, date of mailing Mar. 18, 2015, 4 pages.

(Continued)

*Primary Examiner* — Dao Ho
(74) *Attorney, Agent, or Firm* — Nixon Peabody LLP; Justin D. Swindells

(57) ABSTRACT

An Identification Device for providing validation information. The Identification Device includes a Token and a Validator. The display is adapted to display, during an Operational Phase, a first security code, referred to as the Indicator-of-Clearance (IoC) code, indicating the Clearance Status of the Token, whereby the first security code is generated by an Indicator-of-Clearance Function, such as a digital signature or hash function, programmed on the processor unit based on the Clearance Status and the Validator Clock.

24 Claims, 10 Drawing Sheets

(56) References Cited

U.S. PATENT DOCUMENTS

| | | | | |
|---|---|---|---|---|
| 2006/0120607 A1* | 6/2006 | Lev | .................... | G06K 9/00624 382/217 |
| 2007/0013610 A1* | 1/2007 | Mooney | ............. | G07C 9/00119 345/2.1 |
| 2008/0238670 A1* | 10/2008 | Carney | ................... | B42D 25/00 340/546 |
| 2009/0321517 A1 | 12/2009 | Deane | | |
| 2011/0161232 A1* | 6/2011 | Brown | .................... | G06F 21/32 705/71 |

OTHER PUBLICATIONS

International Search Report, PCT/BE/2014/000054, date of mailing Mar. 10, 2015, 3 pages.

International Written Opinion, PCT/BE/2014/000054, date of mailing Mar. 18, 2015, 5 pages.

Invitation pursuant to Article 94(3) and Rule 71(1) EPC and Annex in European Patent Application No. EP 13 786 615.8, dated Mar. 18, 2015, 4 pages.

\* cited by examiner

Displayed Trust Data 45 = 12+13+14
MAC Data 49 = 45+15 = 12+13+14+15

SYSTEM AND A METHOD FOR VALIDATING AN IDENTIFICATION TOKEN

CROSS-REFERENCE TO RELATED APPLICATIONS

This application is a continuation of prior International Patent Application Serial No. PCT/BE2014/000054, filed Oct. 6, 2014, which claims the benefit of priority of International Patent Application Ser. No. PCT/BE2013/000052, filed Oct. 4, 2013, and International Patent Application Ser. No. PCT/BE2014/000034, filed Jul. 22, 2014, all in the name of Gentago Services and all of which are incorporated herein by reference in their entireties.

TECHNICAL FIELD

The present invention relates to the field of identity fraud protection and more specifically to a system and a method for validating the validity of the identification data displayed on and/or stored in an electronic identification Token, and thus determining if clearance can be given to the Token while preventing fraudulent use.

BACKGROUND ART

Electronic identification Tokens, such as e-identification (e-ID) cards, security badges or e-passports, are commonly used for security and identification purposes of the owner of the Token. The owner of the Token, referred to hereinafter as the Owner, may include a person or an object carrying a Token and being uniquely identified by the information stored in or displayed on the Token. Such electronic identification Tokens may include an electronic chip having a memory adapted to store Identification Data (ID) to uniquely identify the Token Owner. For example such Identification Data may include for a person as Owner the name of the Owner, national ID number, a picture, date of birth, nationality, official employee number, education degree, security clearance level, membership contract number, home address, and/or other related Identification Data. Examples for an object as Owner may include its serial number, license plate number of a car, insurance contract number, ID number of the company who produced the object and/or other related Identification Data. Furthermore, the Token may be provided with a communication interface enabling the Token to interact with an electronic authentication and validation system. The communication interface may be used to perform an electronic identification of the Token Owner and authentication of the Identification Data stored therein. Since electronic identification and authentication of the Token is not always possible, a subset of the Identification Data may be made visible on a Token location. For example the Token may include on a visible location the photo of the Owner along with his name and home address as a printed overlay on the Token.

Due to the value of the Identification Data, identification Tokens have become a major target of fraudulent attacks. For example, an authentic Token of a valid Owner may be used in a fraudulent way by replacing the visible Identification Data displayed on the Token by falsified Identification Data of a false Owner. Furthermore, a fraudulent Token may be manufactured containing falsified Identification Data. In a further example, an authentic Token may be used in an invalid security clearance situation whereby a Token Owner having a predetermined Clearance Status may use his Token to gain access to a part of a building that he is not authorised to enter. Tokens that are falsified, which for example means not authentic, or that are authentic but used in an unauthorised manner, are all invalid Tokens and will be referred to as such.

In order to prevent such attacks, a range of known security measures have been implemented in the state of the art. For example, in order to prevent falsification of the visible information on the Token, the Token may be provided with a set of visible security items such as holograms, special background prints and special colour dyes.

However, these visible security measures have shown to be relatively ineffective to prevent fraudulent use of a Token. Therefore, recognizing an invalid Token by a visible inspection using the visible security items may become extremely difficult or burdensome especially in the case where a large number of Tokens need to be validated and thus also authenticated.

To overcome the issues related to the visible security measures, validating a Token may be performed by directly accessing the Identification Data stored in the memory of the Token. For example, this may involve approaching the Token and/or Token Owner and reading out electronically the Identification Data. However, such an approach may be difficult to implement in the case where a larger number of Tokens need to be validated, for example, when desiring to verify the Tokens of a crowd of people working in a building or the Tokens of cars driving around a city.

US20070013610 presents an apparatus and a technique for allowing an electronic badge to establish a wireless online network with a fixed wireless transceiver mounted in a secure facility and to display information received through the wireless network from the wireless transceiver that is relevant to the secure facility. The apparatus requires that the security badge maintains a continuous wireless connection with the transceiver, which wireless connection is realised using a short range radio frequency. However, a disadvantage of this solution is that the maintenance of such wireless connection requires relatively complicated networks and electronic badges. This is because, in order for the system to work effectively, numerous fixed wireless transceivers and relatively strong batteries in the electronic badges are required to maintain a continuous online connection and sufficient autonomy throughout the building, compound or surroundings where the system is supposed to work. A further disadvantage of this solution, is that validation of the security badge may only be performed while the badge is connected to the wireless network. Therefore, in the case where the network is not available, or the wireless connection is interrupted such a validation procedure cannot be carried out. Moreover, in the case where the invalid badge is not arranged to be connected to the wireless connection once present in a building area, the security facility may remain unaware of the presence of such an invalid badge.

Therefore there remains a need for a validation, and thus authentication, procedure which may be carried out even where the Token is not connected to a security facility.

DISCLOSURE OF THE INVENTION

It is an aim of the present invention to provide a system capable for continuously validating, and thus also authenticating, a Token or a number of Tokens and the information stored therein, in an easy and quick way.

This aim is achieved according to the invention with the Identification Device, comprising a Token with a Validator, showing the technical characteristics of the first independent claim.

According to embodiments of the present invention, the use of an Identification Device arranged for displaying continuously during an Operational Phase an Indicator-of-Clearance code (IoC), which is related to the Clearance Status, i.e. a status indicating that the Token Owner is allowed to perform a valid action or obtain a valid status, of the Token Owner, and, more preferably, a Proof-of-Trust code (PoT), which is related to the authenticity of the IoC code and other information displayed on the Identification Device, may allow a validation, and thus authentication, procedure to be implemented that successfully prevents fraudulent attacks in a low complexity and cost effective manner.

According to embodiments of the present invention, a Centralised System may be provided, which may belong to or arranged to be connected to a Trust Authority, such as a governmental or a private organisation. The Centralised System may be arranged to interact with the Identification Device and transfer secure information through a Connector device, which information may be used during an authentication procedure during an Initialisation Phase. By using the Connector device to transfer information between the Centralised System and the Validator device, an additional checkpoint may be implemented. The Connector may be arranged to check the authenticity of the Validator before transferring Data from the Centralised Authority, thereby preventing a falsified Validator from accessing the security information transferred.

According to embodiments of the present invention, the information transferred between the Centralised System and the Validator device may be over an end-to-end secure messaging channel and/or may be encrypted so that only authorised parties may use the encrypted information and for example eavesdropping is avoided. For example, the information to be transferred may be encrypted using a number of encryption algorithms available in the state of the art, such as public-key encryption or a symmetric-key algorithm.

Furthermore, a Proof-of-Trust System may be implemented according to embodiments of the present invention, which system in addition to the Identification Device and the Centralised System, may be further provided with a Controller device. In this case the Controller may be an independent device, which may be used to monitor, and thus validate, the data displayed on the Validator Display during the Operational Phase, such as the IoC and the PoT codes. As a result, an additional layer of security is added to the Proof-of-Trust system, which may prevent the use of invalid Tokens in a secure environment. An additional advantage of using a Controller device is that the validity of a large number of Tokens may be carried out without the need for approaching the individual Tokens.

It is another aim of the present invention to provide a method.

This aim is achieved according to the invention with a method for validating the information displayed on the Identification Device comprising the steps of:

initialising the Validator comprising the steps of: presenting a Token containing information of a person or object to the Validator, such information comprising Identification Data comprising a first subset representing Clearance Data, which Identification Data uniquely identifies the Owner; connecting the Token to the Validator through the Validator communication means, thereby allowing the Validator to access the information stored in the memory of the Token; connecting the Validator to a Connector of a Centralized System through the Validator communication means; transferring data between the Validator and the Centralized System during an Initialisation Phase through the Connector, such data comprising a clock synchronization signal for synchronizing the Validator clock to a Centralized system clock of the Centralized System; and Clearance Rules specifying whether the Token based on the Clearance Data stored in the Token, can be given a specific Clearance Status that indicates that the object or person, i.e. the Owner, is allowed to perform a valid action or obtain a valid status; and operating the Validator during an Operational Phase for validating the information in a Token comprising the steps of: displaying the Trust Data on the Validator display; generating a first security code, referred to as the Indicator-of-Clearance code, indicating the Clearance Status of the Token, whereby the first security code is generated by an Indicator-of-Clearance Function, such as a digital signature or hash function, programmed on the processor unit based on the Clearance Status and the Validator Clock. In further embodiments, the Identification Data comprises a second subset representing Trust Data and a second security code is generated, referred to as the Proof-of-Trust code, generated by a MAC function programmed on the processor unit based on the Trust Data displayed on the Validator display and the first security code; and further additionally displaying on the display of the Validator the first security code and the second security code.

BRIEF DESCRIPTION OF THE DRAWINGS

The invention will be further elucidated by means of the following description and the appended figures.

MODES FOR CARRYING OUT THE INVENTION

Figure 1:
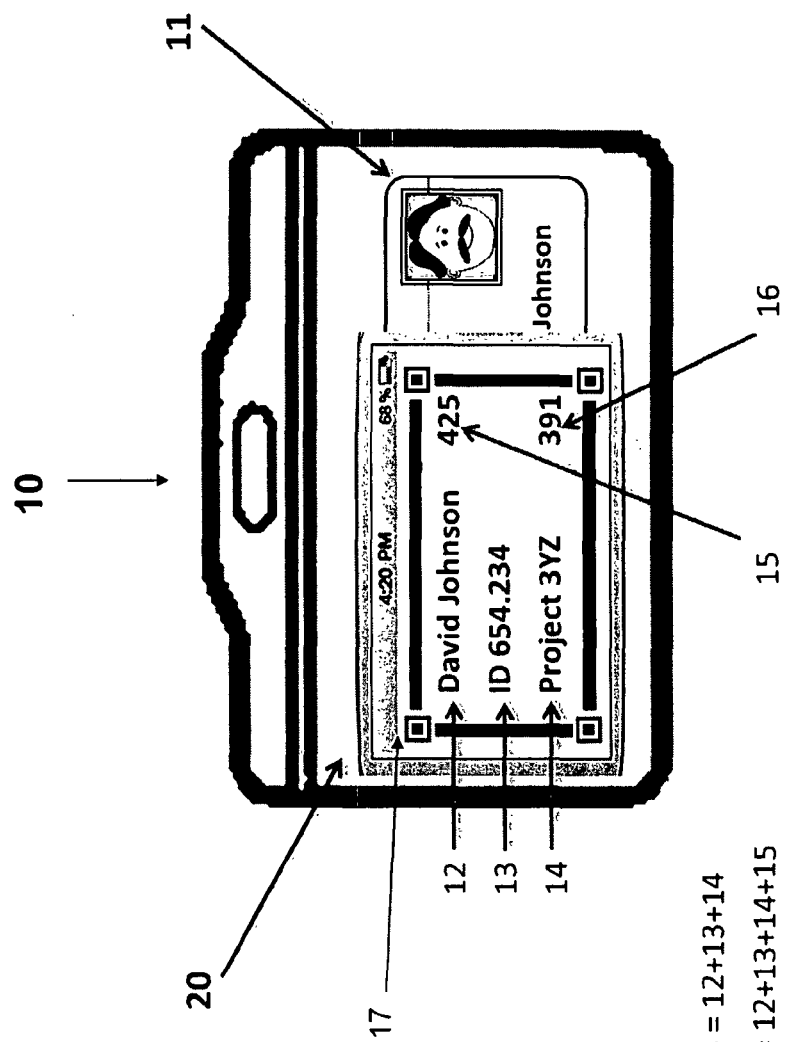
FIG. 1 shows an Identification Device according to embodiments of the present invention.

Protecting Identification Data against identity fraud has become a major challenge for governmental and private organisations alike. However, an even greater challenge is authenticating and/or validating that the Token and the Information Data stored therein are authentic, valid and have been issued by a Trust Authority. A Trust Authority may be a private or a governmental organisation having the right to issue such a Token, for example a company may issue security badges to the employees of the company. A Token may be provided to be carried around before Validation like for example a badge, an e-passport, an identity card, or any other means used for identification purposes that are suitable to be carried around by the Owner. The format of the Token in such case can be adapted to the provision that it is carried around, for example the Token can have the typical dimensions of a credit/debit card and thus is for example provided to be carried around in a badge holder. Other embodiments are however possible. The Token can for example have the shape of a USB stick and/or a key, for example an electronic key, to be carried around on a key ring for example together with other keys. According to such embodiments, the carrier of the Token is assumed to be the Owner by the fact that he has control over the Token. However, this is not always the case and the Token can be controlled by somebody else than the Owner, for example by mistake or by theft. The Token can however also be provided not to be carrier around by the Owner and can for example be in the form of an element of a computer, for example a server, for example together with other such Tokens as part of a database of Tokens in a database server. In such an embodiment, the Owner can no longer carry around the Token itself before Validation and access to the Token, to be used in the further steps of the invention, for example during Validation, is controlled by the ability to provide an Identification Code. The Identification Code can be a specific code memorized by the Owner, and/or can be a code which is accessed by the Owner by any one or more of for example:

- providing biometric information, such as for example, if the Owner is a person, any one or more of the fingerprints of the Owner, any one or more of the irises of the eyes of the Owner, the electrocardiogram of the Owner, etc.
- reading out a memory comprising the Identification Code, the memory being in the form of for example a chip, a magnetic strip, etc. on for example a card, a USB stick, etc.
- presenting a physical object with a certain characteristic, such as for example present a key, presenting an object covered in a certain coating, for example comprising a synthetic DNA such as for example DataDotDNA, etc.
- providing other information identifying an object as the Owner of the Token such as for example by analyzing the noise of the car as Owner, etc.

To validate the validity of the Token, a validation procedure may be performed at a designated checkpoint. Such an inspection may involve a visual inspection of the data printed on the Token if the Token or the physical object giving access to the Identification Code can be carried around, which may further be combined with an electronic inspection of the Identification Data stored therein, if present. The Identification Data may be stored with a. Secure Element of the Token specified by the Trust Authority, which Secure Element may be a predetermined location of the memory of the Token used explicitly for storing Identification Data or a separate component in the chip of the Token. However, it has been found that such measures cannot guarantee the effective detection of invalid Tokens, especially when somebody succeeds in bypassing the electronic inspection at an entry checkpoint or if entry checkpoints cannot be physically implemented.

Therefore, according to embodiments of the present invention, an Identification Device may be provided to continuously indicate in a quick and a cost effective manner the validity or invalidity—as established during an Initialisation Phase—of a Token or a number of Tokens and the information stored therein.

Although the workings of the present invention will be described with reference to the identification Token being configured as a security badge, this should be understood as a non limiting example since other types of identification Tokens may also be authenticated and validated using the present invention. Such examples may include but not limited to an e-identification card, an e-passport, or an identification e-tag placed on an object or the embodiments described above.

The Tokens and their Owners can be confined to a small closed space or can be distributed in a large geographical area, even across countries. For example a validation procedure may be carried out on the Tokens of each construction worker on a 20 km cross border road construction site, where the Tokens must be registered on a specific time registration system and be enlisted with a social security organization. A further example of a validation procedure may involve the registration of the Tokens of all cars used on the roads in a specific geographical area on a specific day.

A set of Tokens that are all individually authenticated by the Trust Authority and that meet the clearance criteria set by the Trust Authority during an Initialisation Phase so that they are considered as valid for these clearance criteria, will be referred to hereinafter as a Set-of-Valid-Tokens. Through the present invention, the Trust Authority is able to provide to any party a continuously visible authentication of each Token that is a member of a Set-of-Valid-Tokens. Complementary, the Trust Authority will also immediately visibly identify to any party a Token that is not a member of a Set-of-Valid-Tokens.

To ensure that the data in the Token is not corrupted, the Token and the information stored therein may be digitally signed by the Trust Authority, for example a governmental or a private organisation.

According to embodiments of the present invention, Identification Devices may be provided, which enables a Trust Authority to validate the validity of a large number of Tokens and the authenticity of the Identification Data stored therein.

The Identification Device comprises the Token. The Token can be comprised in the Identification Device in several ways for example depending on the nature of the Token as discussed above.

For example, a Token that is suitable to be carried around by the Owner can be received in the Identification Device, for example the Validator, as part of it, for example when the Token is a card, the Identification Device, for example the Validator, can be provided with a slot in which the Token can be slit or when the Token is a USB stick, the Identification Device, for example the Validator, can be provided with a USB reader in which the USB stick can be inserted such that its memory can be accessed. However, it is also possible that the Token interacts with the remainder of the Identification Device, for example the Validator, such that information of the Token is copied onto a part of the Identification Device, for example the Validator, thus forming the Identification Device, after which the initial Token can be removed again. In such case, a further Token is created in the part of the Identification Device, for example the Validator, the further Token comprising the memory storing the information of the person or object, the information comprising the Identification Data of the Token presented to the Identification Device. In such an embodiment, the initial Token carried around by the Owner can for example be blocked such that it becomes no longer possible to interact with a further part of another Identification Device, for example a further Validator. The initial Token can for example be unblocked by presenting it again to the initial Identification Device, after removal of the further Token by deletion of the corresponding Identification Data.

The Token can, as described above, however also be provided not to be carrier around by the Owner and can for example be in the form of an element of a computer, for example a server, for example together with other such Tokens as part of a database of Tokens. In such case, as above, the Token is presented to part of the Identification Device, for example the Validator, more in particular the Validator Communication means, and information of the Token is copied onto a part of the Identification Device, for example the Validator. In such case, a further Token is created in the Identification Device, the further Token comprising the memory storing the information of the person or object, the information comprising the Identification Data of the initial Token. In such an embodiment, the initial Token can for example also be blocked such that it becomes no longer possible to interact with a further Identification Device. The initial Token can for example be unblocked after a certain amount of time and/or by presenting it again to the initial Identification Device, after removal of the further Token by deletion of the corresponding Identification Data.

In such embodiments, the presentation of the Token to the Validator, is for example controlled by the computer, for example database server, on which the Token is stored depending on the Identification Code presented to it. For example, depending on check of the input of the presumed Owner, the Identification Code is transmitted to the computer, for example database server, and upon control of the Identification Code by the computer, the corresponding Token is then transmitted to the Validator communication means of the Validator for further processing.

The Identification Device may be arranged for authenticating and validating the information stored in a Token issued by a Trust Authority. The Token may be provided with a memory for storing Identification Data that uniquely identifies the identity of the Owner of the Token. The Trust Authority may encode the Identification Data in the Token. A first subset of the Identification Data, referred to hereinafter as the Clearance Data, may indicate that the Owner of the Token has the clearance of the Trust Authority to perform a certain action or to obtain a certain status so that the Trust Authority for example will consider the Token as "valid" for this action or this status. A preferred second subset of the Identification Data is referred to hereinafter as the Trust Data.

The identification device may further comprise a Validator device for validating the authenticity and/or validity of the Token. The Validator may comprise a display adapted to display the Trust Data, a subset of the Identification Data stored in the Token. The display can be a fully electronic display or a combination of both an electronic display part and a printed display part. The electronic display may be integrated with the Validator through a wired connection or through a wireless connection, such as an infrared or radiofrequency broadcasting technology. The use of a wireless connection might allow to place the display part of a Validator at a separate location from the remaining part of the Validator, for example by placing the Display of a Validator on the roof of a car while the remaining parts of the Validator is attached to the driver of the car.

The Validator may further comprise a processor unit, a Validator clock and Validator communication means for interacting with the Token and with a Connector of a Centralized System. The Validator may further be adapted to transfer data during an Initialisation Phase between the Centralized System and the Validator through the Connector. According to embodiments of the present invention, the data to be transferred may be over an end-to-end secure messaging channel and/or may be encrypted using an encryption algorithm, such as public-key encryption or a symmetrical-key algorithm. It should be noted that other encryption algorithms or techniques may be used for encrypting the data to be transferred such that only authorised third parties may use the data. Such data may comprise for example, a clock synchronization signal for synchronizing the Validator clock to a centralized system clock of the Centralized System, and Clearance Rules specifying whether the Token, based on the Clearance Data stored in the Token, can be given a specific Clearance Status that indicates that the Owner is allowed to perform a valid action or obtain a valid status. For example, the Clearance Rules enable the processor unit to calculate a Clearance Status with a Clearance Function programmed on the processor based on the Clearance Data obtained from the Token and the Clearance Rules for example obtained from the Centralized System. The display of the Validator may further be adapted to display, during an Operational Phase for example in addition to the Trust Data, a first security code, referred to as the Indicator-of-Clearance (IoC) code, indicating the Clearance Status of the Token generated by an Indicator-of-Clearance Function, such as a hash function or a digital signature, programmed on the processor unit for example based on the Clearance Status and the Validator Clock, for example through an incremental status representing the Validator Clock; for example the time itself, and preferably, a second security code, referred to as the Proof-of-Trust (PoT) code, generated by a Message Authentication Code function or MAC function programmed on the processor unit based on the data displayed on the Validator display, namely the displayed Trust Data and the Displayed IoC code. This set of data used as input to the MAC function for the generation of the second code is referred to hereinafter as the MAC Data.

According to preferred embodiments of the current invention, the IoC and/or PoT code comprises any or more of the following: a number, a letter, a light having a certain colour, for example red, green, blue, yellow, cyan, magenta, etc.

The Validator preferably comprises a portable device which can be carried around by the Owner of the Token. The portable device for example comprises the display and the Validator clock. The other features of the Validator or even the Identification Device, such as for example the Validator communication means, the Token and the processor unit can be provided on the portable device but can instead also be provided on a separate part of the Validator which is not carried by the Owner, for example a computer, such as for example a server. According to such embodiments of the present invention, the Validator, for example the part of the Validator that can not be carried around, can, for example, generate a series of first security codes, for example as part of a Table-of-Codes, which are then transferred to the portable part of the Validator during the Initialisation Phase, for example to a memory of the portable device, to be displayed during the Operational Phase on the display of the Validator. This way, the Tokens and the periodical generation of the first security codes can be centralized having the advantage that the portable device can be made more simply and if lost, creates less of a security hazard. The series of first security codes may for example be compliant with statistical randomness.

In another embodiment of the present invention, the Identification Data on the Token might also comprise security information, on the Owner of the Token, for example for a person as Owner, biometric physical data such as his fingerprint or his electrocardiogram profile or biometric knowledge data such as a secret pin-code only known by the Owner, and for an object as Owner biometric signature data such as the noise profile of the object.

The Identification Device, for example the Validator, for example the portable device, can be provided with input means for inputting further security information, for example, to periodically control the identity of the carrier of the portable device. For example, the Identification Device, for example the Validator, for example the portable device, can comprise a biometric reader which can periodically check the identity of the carrier of the Identification Device, for example the Validator, for example the portable device, for example by checking, for example periodically, the electrocardiogram of the wearer and comparing it with a previously recorded electrocardiogram, for example an electrocardiogram stored in the Token. Another example might by to request the wearer to input a code, for example a pin code, and compare it with a reference code, for example stored in the Token. Another example might be a Validator attached to a car as Owner that has a sound detector that can detect the noise profile of the car and compare it with the noise profile stored in the Token of the car. In all these cases, the Validator might be configured to stop displaying IoC and the preferred PoT codes when the biometric signature data detected does not correspond with the biometric signature data stored in the Token, thereby ensuring that the Validator only works when it is attached to the real Owner of the Token. Through this feature, an additional checkpoint against fraud is implemented.

By using the Identification Device of the present invention, the IoC and the preferred PoT codes, if present, of the authentication and validation procedure are continuously displayed on the Validator display and will change in function of the Validator Clock, for example at each incremental status of the Validator Clock. As the Clearance Status and the incremental status of the Validator Clock are preferably the same on all Identification Devices of Tokens of a Set-of-Valid-Tokens, the IoC code on all these Identification Devices will change to the same new IoC code at each incremental status of the Validator Clock. Identification Devices of Tokens that are not part of a Set-of-Valid-Tokens will continuously have different IoC codes, except by chance. Therefore, the IoC code already provides a first check on whether a Token is part of a Set-of-Valid-Tokens and this without always having to be connected to a network and/or without having to use other types of rather complicated systems using, for example navigation, for example satellite navigation, (for example Global Positioning System (GPS), GLONASS, Galileo, etc.

The continuous display of the IoC and the preferred PoT codes may allow for the validation procedure of the Token to be performed in a number of ways. For example, validation of the Token may be verified by a pure visual inspection of the information displayed on the Validator display at any point in time. Therefore, the validation of a Token can be performed by a person or a system, without approaching the Token to access the electronic information stored therein. Moreover, the validation of the Token does not require the Validator to be continuously connected via a network to the Centralised System of the Trust Authority. Another example of the validation of a Token might be by using a system that can decode the information that is provided by the Validator to the Display of the Validator, for example by reading the information on the Display of the Validator. This system can do the validation of multiple Identification Devices. When this system is for example provided with access to one Identification Device with a Token of a Set-of-Valid-Tokens, it can verify the IoC of other Identification Devices and identify the Identification Devices that have Tokens that are also member of the same Set-of-Valid-Tokens. In addition, because of the continuous display of the Ioc code and the PoT code, if present, it is no longer required to approach a person to ask for his credentials.

According to embodiments of the present invention the Centralised System, may be provided with a Connector device and a Centralised System clock. The Connector device may be adapted to interact, preferably securely interact, with the Validator communication interface to transfer data during an Initialisation Phase between the Centralized System and the Validator, such data comprising a clock synchronization signal for synchronizing the Validator clock to the Centralized System clock, and Clearance Rules specifying whether the Token, based on the Clearance Data stored in the Token, can be given a specific Clearance Status that indicates that the Owner is allowed to perform an action or obtain a valid status. The Centralised System may further be arranged to have access to a Secure Element of the Trust Authority on the Token or the Validator, which may contain data information used during the authentication of the Token or the Validator. According to embodiments of the present invention, the data to be transferred between the Centralized System and the Validator may be over an end-to-end secure messaging channel and/or may be encrypted using an encryption algorithm, such as public-key encryption or a symmetrical-key algorithm. It should be noted that other encryption algorithms or techniques may be used for encrypting the data to be transferred such that only authorised third parties may use the data and/or eavesdropping is avoided.

By using a Connector for transferring information between the Centralised System and the Validator device, an additional checkpoint may be implemented. The Connector may be arranged to check the authenticity of the Secure Element of the Token and the Validator before transferring Data from the Centralised System. As a result unauthorised access of this information or replication of such information may be prevented.

According to embodiments of the present invention, a Proof-of-Trust-System (PoTS) may further be provided. The Proof-of-Trust-System may comprise at least one Identification Device according to the present invention, which is arranged to cooperate, or being connected during an Initialisation Phase to the Centralised System according to the present invention. The PoTS system and the devices used thereof may be controlled by the Trust Authority. Therefore, an attempt to falsify a device of the PoTS system would not be successful because a falsified device may not succeed in transferring the required data, which enable communication with the other devices in the System. As a result, a falsified device may become easily detectable in a PoTS system.

According to preferred embodiments of the Proof-of-Trust-System according to the invention, some or all of the parts of the Proof-of-Trust-System are tamper resistant, for example separately or as a whole. The part or parts according to such embodiments for example are designed to resist unauthorized intrusion by third parties and/or unauthorized manipulation by third parties who, for example, are unauthorized to access certain information available in the part or parts, such as for example information relating to encryption used by the Proof-of-Trust-System such as for example a private key of for example a public-key encryption algorithm. The parts of the Proof-of-Trust-System that preferably are tamper resistant are for example any one or more of: the Identification Device, The Centralized System, more in particular its Connector, the Token, more in particular its memory, the Validator, more in particular, the display, the processor unit, the Validator clock, the Validator communication means, etc. The tamper resistance can for example be obtained by use of tamper resistant chips who are, for example able to zeroise, or even cold-zeroise, when tampering is detected and/or by use of more mechanical measures physically breaking the parts, or even the Proof-of-Trust-System, for example the Identification Device, for example the token or the Validator or one of their components.

According to embodiments of the present invention the data transferred, preferably transferred over an end-to-end secure messaging channel and/or transferred securely using an encryption algorithm available in the art, during an Initialisation Phase of the Validator between the Centralized System and the Validator may comprise a set of Time Rules. The Time Rules enable the processor unit to calculate with a Time Function programmed on the processor, a set of time intervals, referred to hereinafter as a Set-of-Time-Points. The Set-of-Time-Points are provided as input to the Indicator-of-Clearance Function such that respective Indicator-of-Clearance codes are generated for each of the time intervals.

By using the Time Rules, the IoC code may be generated at specific time intervals with respect to the Validator clock, which Validator clock is synchronised with the Central System clock and therefore with all Validator Clocks of all Validators used for a Set-of-Valid-Tokens. The Time Rules may only be known to the Trust Authority and may be changed by the Trust Authority for a next session when the Proof-of-Trust System is activated. Therefore, an invalid Token not having access to the Time Rules would not be able to generate the IoC code at the specified intervals. The IoC codes generated at each time interval specified by the Time Rules may be arranged to synchronously switch the IoC code on all the Validators to an unpredictable new IoC code. As a result, a quick visual inspection and a comparison with the IoC code(s) generated by a valid Token would be sufficient to identify an invalid Token out of a number of Tokens, and thus validate the Token. For example a fraudulent party who cannot calculate the next IoC, can only copy that IoC once it is visible on the Validators of Tokens from the Set-of-Valid-Tokens. This party must then, at each point in time of the Set-of-Time-Points copy this new IoC and get it on the display of his fake Validator. This type of fraud is complex to implement, unreliable at all time points and will always have a time delay that is detectable by independent observer The Time Rules may further define a time limit period, at which an Operational Phase of the Validator ends, for example a session of an Operational Phase of the Validators ends. During the Operational phase the Validator is arranged to generate continuously authentication codes, such as the IoC and PoT codes. At the expiry of the Operational Phase the Validator stops generating Indicator-of-Clearance codes and/or Proof-of-Trust codes until a new Initialisation Phase occurs. The Time Rules for example may identify that the Operational phase of a Validator Device may end at the end of a specified working day.

In case the Validator comprises a part that is a portable device which can be carried around by the Owner of the Token, and another part of the Validator which is not carried around by the Owner, for example a computer, such as for example a server, then the part of the Validator that can not be carried around may also generate the Set-of-Time-Points and include them in the Table-of-Codes that is transferred during the Initialisation Phase to the portable part of the Validator.

During the Operational phase the Validator may continuously generate authentication codes in an autonomous manner. Therefore, in contrast to solutions in the prior art, the Identification Device or the Centralised System, or the Proof-of-Trust System may not be required to be connected during the Operational Phase to a wireless or wired network for transferring data or instructions between the components of the system. This may have as an effect that the cost and complexity of such a continuous authentication procedure may greatly be simplified.

During the period specified by the Time Rules the Indicator-of-Clearance codes generated by the Indicator-of-Clearance Function may be identical on all the displays of all the Validators with Tokens that are valid, namely with the same Clearance Status. This feature may enable identification of an invalid Token by Owners of authentic Tokens located in the proximity of the invalid Token. As a result, a social control scheme may be implemented. This social control scheme may rely on independent observers, for example, Token Owners working in the same security clearance area, to notice that the IoC code displayed on a Validator connected to an invalid Token does not correspond to the one displayed on the Validators of the rest of the Token Owners, and report any abnormality to a responsible authority.

According embodiments of the present invention, the processor unit of the Validator may be adapted to select an Animated Indicator-of-Clearance Transition (IoC Transition) from a predetermined database. The database may comprise Animated Indicator-of-Clearance Transitions to be displayed on the display of the Validator prior to or concurrently with the displaying of a new Indicator-of-Clearance code. The Animated Indicator-of-Clearance Transitions may be encoded in an internal database of the Validator, for example before the Operational Phase, for example when the Validator was produced. Alternatively, the Animated Indicator-of-Clearance Transitions may be created in the Central System of the Trust Authority and may be transferred during the Initialisation Phase to the Validator, for example as an element of the Clearance Rules. On reception of these Clearance Rules, the Validator for example will then extract the Animated Indicator-of-Clearance Transitions and will for example store them in the internal database within the Validator, for example in the Table-of-Codes, for example within the portable device. The displayed Animated Indicator-of-Clearance Transitions are preferably identical and displayed synchronously on all Validators linked to a Token of a Set-of-Valid-Tokens. Thereto, the processor unit of each Validator is for example adapted so that each potential Indicator-of-Clearance code has a corresponding uniquely different Animated Indicator-of-Clearance Transition codified in a database, for example an internal database, of Animated Indicator-of-Clearance Transitions in the Validator and to be displayed on the display of the Validator prior to or concurrently with showing the new corresponding Indicator-of-Clearance code, and wherein the Animated Indicator-of-Clearance Transition database is identical for all Validators used for Tokens that are part of or want to be part of the Set-of-Valid-Tokens. For example, the Indicator-of-Clearance Function might have a database with different 5-seconds animations for each potential IoC code. A different database might exist for each time point of the Set-of-Time-Points. This animation might include coloured blocks and symbols that might move over the display of the Validator. For example, the display might comprise differently coloured light sources, for example diodes or LEDs, which are provided to flash, the flashing light sources forming Animated Indicator-of-Clearance Transitions which are for example shown concurrently with the IoC code allowing a further easy control.

Because the IoC code, the Indicator-of-Clearance Function and the Animated IoC Transition databases may be the same on every Validator of a Set-of-Valid-Tokens, the same Animated IoC Transition preceding or concurrently with every time point of the Set-of-Time-Points may be shown on all Validator displays. When the animation for example covers the whole display of the Validator, the social control scheme is even more visible from a remote distance. Therefore, use of an invalid Token may become even more difficult as a fraudulent party would have to mimic an unpredictable animation on his own fake Validator synchronously with all Validators of the Set-of-Valid-Tokens.

According to an embodiment of the present invention, the data transferred during the Initialisation Phase between the Centralized System and the Validator through the Connector may comprise a set of Indicator Rules used by the Indicator-of-Clearance Function as additional input to generate the Indicator-of-Clearance code.

The Indicator Rules can be a set of confidential rules determined by the Centralised System, which are for example only valid for the predefined period, which period is defined by the Time Rules, e.g. a predefined period that ends at the end of a working day. The Indicator Rules may be identical on all Validators for Tokens that are or want to be member of the Set-of-Valid-Tokens, thereby ensuring that the IoC is calculated in the same manner on all these Validators. The Indicator Rules may for example be in the form of parameters further defining the Indicator-of-Clearance function.

In an alternative embodiment, the Indicator Rules may be an independent set of Rules transferred by the Trust Authority in a strictly confidential manner during the Initialisation Phase from the Centralised System through a Connector to the Validator.

The integration of the Indicator Rules with the Indicator-of-Clearance Function can make the security of the system more robust. The Trust Authority may for example consider publishing the Indicator-of-Clearance Function while maintaining the Indicator Rules secret. In the case, where accidentally one instance of the Indicator Rules become public, it would be sufficient for the Trust Authority to generate a new set of Indicator Rules for a new period to ensure that the Proof-of-Trust System is again reliable.

By using the Indicator Rules, the falsification of the IoC and PoT codes may be prevented. Therefore, such Rules may further increase the security and prevent the use of invalid Tokens in a secure environment.

According to further embodiments of the present invention, the data being transferred, preferably transferred over an end-to-end secure messaging channel and/or transferred securely using an encryption algorithm available in the art, during an Initialisation Phase between the Centralized System and the Validator may further comprise a set of Trust Rules used as additional input by the MAC function to generate the Proof-of-Trust code. The Trust Rules can be a set of confidential rules determined by the Centralised System, which are for example only valid for a predefined period of the Set-of-Time-Points, e.g. a predefined period that ends at the end of a working day. The Proof-of-Trust Function might include cryptographic MAC functions with a secret key in which case the Trust Rules might include a secret key for those cryptographic MAC functions. The Trust Rules are identical on all Validators for Tokens that are or want to be member of the Set-of-Valid-Tokens, thereby ensuring that the PoT is calculated in the same manner on all these Validators.

The integration of the Trust Rules with the MAC Function can make the security of the system more robust. The Trust Authority can now make the MAC Function public while maintaining the Trust Rules secret. If for some reason one instance of the Trust Rules become public, it is sufficient for the Trust Authority to generate a new set of Trust Rules for a new period to ensure that the Proof-of-Trust System is again reliable.

In case the Validator comprises a part that is a portable device which can be carried around by the Owner of the Token, and another part of the Validator which is not carried by the Owner, for example a computer, such as for example a server, then the PoT codes might be generated in the non-portable part of the Validator and transferred to the portable device during the Initialization Phase. The non-portable part of the Validator can, for example, generate a series of PoT codes, for example as part of a Table-of-Codes, which are then transferred to the portable device, for example to a memory of the portable device, to be displayed during the Operational Phase on the display of the portable device. This way, the Tokens and the periodical generation of the PoT codes can be centralized having the advantage that the portable device can be further made more simply and if lost, creates less of a security hazard.

By using Trust Rules and Indicator Rules that may only be valid for a predetermined amount of time, it is guaranteed that the generation of the IoC and PoT codes are practically impossible to be falsified over a longer time frame, for example years.

The Validator may further comprise a memory for storing the Clearance Rules, Time Rules, Trust Rules and Indicator Rules. The Clearance Rules, Time Rules, Trust Rules and Indicator Rules may be stored in a specific location in the memory, which is specified by the Trust Authority during issuing the Validator Device.

Therefore, during authentication of the Validator the exact location of the memory where the Clearance Rules, Time Rules, Trust Rules and Indicator Rules are stored may further be used as a security feature.

The Validator can also comprise a memory, for example the same memory as mentioned above, for storing any one or more of the Indicator-of-Clearance Function, the MAC function, and, if present, the Time Function and/or the Clearance Function.

According to embodiments of the present disclosure, the Validator communication means may comprise, for example exclusively comprise, wireless communication means during the Initialisation Phase, for example NFC, Bluetooth, mobile telephone networks, etc. The Validator communication means during the Initialisation Phase may also include, for example exclusively include, the use of wired communication means, such as physical contacts, cables, USB, etc.

The use of wireless communication means may enable the Validator to connect to other devices without the need for a physical connection. The use of wired communication may be used for transferring the data from the Centralised System to establish a more secure connection for transferring data. The use of wired communication between Tokens, Validators, Connectors and the Centralised System during the Initialisation Phase may avoid all the security risks of wireless communication, providing an additional benefit of the Proof-of-Trust-System compared to previous art.

According to embodiments of the present disclosure, if the Validator comprises a part that is a portable device which can be carried around by the Owner of the Token, and another part of the Validator which is not carried by the Owner, then the portable device may comprise communication means for communicating with the other part of the Validator during the Initialisation Phase, for example wireless communication means, for example NFC, Bluetooth, mobile telephone networks, etc., and/or for example wired communication means, such as physical contacts, cables, USB, etc.

According to embodiments of the present invention, the Token and the Validator may be integrated into a single Identification Device, which will be issued by a Trust Authority. In this configuration, the Token may be adapted to display and generate the displayed Trust Data and the IoC and PoT code according to the information received from the Centralised System through the Connector.

By integrating the Token and the Validator into a single Identification Device, the cost and complexity may be reduced considerably.

According to embodiments of the present disclosure, the Proof-of-Trust-System may further comprise a Controller for validating the validity and thus also the authenticity of the information displayed on the Identification Device and for verifying if a particular Identification Device is a member of a Set-of-Valid-Tokens. The Controller comprises means for capturing data displayed on an Identification Device, a display, a processor unit, a Controller clock and Controller communication means for securely interacting during an Initialisation Phase with a Connector of the Centralized System. The data captured from the display of an Identification Device includes the displayed Trust Data, the displayed Indicator-of-Clearance code and the displayed Proof-of-Trust code. The Controller contains the same Indicator-of-Clearance Function and MAC Function as the Validators used for Tokens of a Set-of-Valid-Tokens. The Controller is adapted to transfer data from the Centralized System through the Connector during an Initialisation Phase. Such data may comprise the required Clearance. Status and a clock synchronization signal for synchronizing the Controller Clock to a Centralized System clock of the centralized system. The processor unit of the Controller is further adapted to generate the required Indicator-of-Clearance code by the Indicator-of-Clearance Function programmed on the Controller processor unit based on the required Clearance Status and, the Controller Clock. The required Proof-of-Trust code is generated by the MAC function programmed on the processor unit based on the displayed IoC code and the displayed Trust Data shown on the Validator display of the Identification Device.

If the Validators of the Identification Devices that must be validated, require the use of Indicator Rules, Time Rules, a Time function and/or Trust Rules, then these rules are also present in the data transferred during the Initialisation Phase of the Controller with the Centralized System and/or the Time Function is programmed on the processor unit of the Controller such as to be able to make the processor unit of the Controller adapted to re-generate the IoC code and the PoT code which is supposed to be shown on the Validator display. According to further preferred embodiments the processor unit is further provided for comparing the IoC code and the PoT code captured from the Validator display with the required IoC code and the required Pot code generated by the processor unit of the Controller such as to be able to detect whether the Token is part of the Set-of-Valid-Tokens or not.

The Controller can thus independently control the validity and thus also the authenticity of the IoC-code, PoT-code and the Trust Data displayed on any of the Validators. The Controller may be arranged to identify invalid Tokens and/or invalid Validators by using information visible on the Validator and without approaching the person or object holding the Validator and Token.

Therefore, by providing a Controller in the Proof-of-Trust system another layer of security is added that guarantees that the Token and the information stored therein are authentic and valid. In the case of an invalid Token, a Controller may detect, possibly even immediately detect, that the information displayed on the Validator is not correct and alert the responsible authority to take appropriate measures.

According to embodiments of the present invention, the processor unit of the Controller may be adapted to display the result of a comparison. The comparison is performed between the Indicator-of-Clearance code and the Proof-of-Trust code generated in the processor unit of the Controller and the IoC code and the PoT code displayed on an Identification Device and captured by the Controller information capturing means.

By displaying directly the results of the comparison between the IoC and PoT codes, the status of the Identification Device and the authenticity of information displayed therein can be more easily determined as it is visually indicated whether the Identification Device is a member of a Set-of-Valid Tokens or not. Furthermore, by directly displaying the results of the comparison the responsible authority may be able to accelerate the authentication procedure of a large number of Tokens and act promptly to an attempt of using an invalid Token in a secure environment.

According to embodiments of the present invention the means for capturing information of the Controller may comprise a device adapted to optically capture and convert the displayed data, more in particular the displayed Trust Data, the displayed IoC code and the displayed PoT code, of the Identification Device to a digital format using an Optical Character Recognition interface. For example, such a device may include a camera connected to a computer that is adapted to convert the image received in a digital format. Examples are surveillance cameras with associated systems, Google Glasses or any other equivalent devices.

By using a Controller having an Optical Character Recognition interface, multiple Tokens may be validated and thus authenticated at once without the need for human intervention and without the need of a wired or wireless electronic connection between the Controller and the Identification Device.

According to embodiments of the present disclosure, the Proof-of-Trust-System may further comprise a Reference Device for allowing third parties to verify the validity and thus also the authenticity of the information displayed on the Identification Device and for verifying if a particular Identification Device is a member of a Set-of-Valid-Tokens. A Third Party is here defined as a person or object that is not the Owner of an Identification Device that is a member of a Set-of-Valid-Tokens. As a consequence, when this Third Party is confronted with a person or object that pretends to be part of a specific Set-of-Valid-Tokens, referred to here in after as the Pretender, this Third Party does not have an Identification Device in his possession that he can use to compare and validate the IoC code displayed on the Identification Device of the Pretender. To resolve this situation, the Trust Authority might provide a Reference Device. The Reference Device has a display and is connected to the Centralised System of the Trust Authority. The Trust Authority might then display on this Reference Device the correct IoC code of a Set-of-Valid-Tokens with a defined exact Time Delay versus the Set-of-Time-Points for these Tokens, for example 10 seconds. The Trust Authority is capable of doing so, as they have knowledge of all functions and data required to generate the correct IoC codes at the correct time points. The Reference Device works internally exactly as a Validator with a valid Token, except that all time points of the Set-of-Time-Points is incremented with a fixed exact Time Delay and that, for example, only the IoC codes are shown on the Display.

A Third Party can then verify the validity of the Identification Device of a Pretender by comparing a new IoC code that appears of the Identification Device of the Pretender and verify that the same IoC code appears on the Reference Device after the Time Delay. As the Reference Device displays IoC codes with a significant visual Time Delay, such as 10 seconds, it does not allow the creation of fake Identification Devices. However, a Third Party can verify through a Reference Device the validity of the Identification Device of a Pretender. An example of the usage of a Reference Device is a restaurant where the waiters are required to have a valid Identification Device. When a Reference Device is visible within the restaurant, a client of the restaurant will be able to verify that the waiters have valid Identification Devices by verifying that each new IoC code displayed on the Identification Device of the waiters appears on the Reference Device with the fixed exact Time Delay, for example 10 seconds.

According to embodiments of the present invention a method for validating and thus authenticating the information in a Token may be provided, the method comprising the steps of: initialising the Validator device in an Initialisation Phase comprising the steps of: presenting a Token containing information of a person or object to the Validator, such information comprising Identification Data comprising Clearance Data and Trust Data, which Identification Data uniquely identifies the person or object; connecting the Token to the Validator through the Validator communication means, thereby allowing the Validator to access the information stored in the memory of the Token; connecting the Validator to a Connector of a Centralized System through the Validator communication means, transferring, preferably securely, data between the Validator and the Centralized System through the Connector, such data comprising all data applicable to all Tokens of a Set-of-Valid-Tokens, which might include Time Rules, Clearance Rules, Indicator Rules, Trust Rules and a clock synchronizing of the Validator clock with a clock of the Centralized System; and processing the information gathered comprising the steps of: calculating in the processor unit of the Validator the Clearance Status of the Token by applying the Clearance Rules to the Clearance Data of the Token through a Clearance Function; calculating, if applicable, in the processor unit of the Validator the Set-of-Time-Points using a Time Function, having as input the Validator Clock and the Time Rules; if the Validator comprises a portable device: calculating and transferring the Table-of-Codes including, if applicable, the Set-of-Time-Points to the portable device, then starting an Operational Phase of the Validator comprising the steps of: calculating in the processor unit of the Validator an Indicator-of-Clearance (IoC) code using an Indicator-of-Clearance Function, such as a digital signature, hash function or an algorithm that selects from the Table-of-codes if present, programmed on the processor unit with as input the Clearance Status, a specific Time Point of, if applicable, a Set-of-Time-Points, the Table-of-codes if present and optional Indicator Rules; displaying at each specific Time Point in the display of the Validator the Trust Data and the IoC code associated with that Time Point; calculating in the processor unit of the Validator a Proof-of-Trust (PoT) code using an algorithm that selects from the Table-of-Codes if present and/or using a Message Authentication Code (MAC) function based on the displayed Trust Data, displayed IoC code and optional Trust Rules, and displaying in the display of the Validator together with Trust Data and IoC code the PoT code generated by the processor unit.

The method may further comprise the use of a Controller device to validate and thus authenticate the information displayed on the display of the Validators of the Tokens that claim to be part of a Set-of-Valid-Tokens. The Controller contains the same Indicator Function, MAC Function and, if applicable, Time Function as the Validators of the Tokens of the Set-of-Valid-Tokens. The Controller prior to be used for authentication and validation needs to undergo an Initialisation Phase similar to that of the Validator. The Controller may be initialised by connecting the Controller using the communication interface to the Centralised System belonging to the Trust Authority through a Connector in a fully secure and confidential manner. Once the Controller is connected to the Centralised System, the required data may be transferred via the communication link established by the Connector. Such data may comprise but not limited to the same data as used in the Validators of the Tokens that claim to be part of the Set-of-Valid-Tokens, namely a clock synchronization signal for synchronizing the Controller clock to the clock of the Centralized System, the required Clearance Status and, if applicable, the Time Rules, the Indicator Rules and/or the Trust Rules. The Set-of-Time-Points, if applicable, may be further generated based on the synchronised clock and Time Function, wherein the Set-of-Time-Points are identical to the ones used in the Validators of the Tokens that claim to be part of the Set-of-Valid-Tokens. Next, the Operational Phase of the Controller may be started for verifying the validity of Identification Devices by (re)generating the required IoC code using the Indicator-of-Clearance Function programmed in the processor unit of the Controller with as input, if applicable, the Set-of-Time-Points, the required Clearance Status and, if applicable, the Indicator Rules. The Controller may comprise capturing means for capturing the information displayed on the Validator display of the Identification Device, and provide the data captured as an input to the processor unit of the Controller, thereby allowing for a direct comparison between the displayed IoC of the Validator and the required IoC generated by the processor unit of the Controller. The results of the comparison may be displayed on the Controller display. To further confirm that the Data displayed on the Validator display is authentic the Controller may be arranged to generate the required PoT code using the MAC Function with as input the displayed IoC code, the Trust Data displayed on the Validator, and, if applicable, the Trust Rules. Once again the required PoT code generated by the processor unit of the Controller may be compared to the PoT code displayed on the Validator and the comparison results may be displayed on the display of the Controller. The results from the comparison between the IoC codes and PoT codes may further be communicated to the Trust Authority or another security authority, so that action against invalid Tokens can be taken immediately.

GENERAL DESCRIPTION

FIG. 1 shows an Identification Device 10 according to embodiments of the present invention, which may be used for authenticating and validating the information in a Token 11. The Identification Device 10 presented therein comprises a Validator device 20, which may be an electronic device provided separately by the Trust Authority, which may be configured to cooperate with the Token 11. For example, a Validator 20 may be a badge holder with a card reader adapted to work together with the Token 11 and that is visible worn on the chest of a person. A further example of a Validator 20 may include a display device mounted next to the license plate of a car or a truck and connected with a device that can electronically read a Token 11 on the dashboard of the car or the truck.

According to embodiments of the present invention, the Token 11 may be provided with a cryptographic digital signature algorithm, referred to as a Secure Element, which may be stored on the Token and adapted not to be copied to the chip of another Token. For example the Secure Element may specify a unique memory location known only to the Trust Authority, where the required data from the Trust Authority may be stored. In a further example, the Secure Element may be an independent electronic component integrated on the electronic chip of the Token. The Secure Element may act as a cryptographic authentication mechanism for the Token to other parties to ensure that only trusted parties have access to the Identification Data 43 stored in the Token. For example, an authentication system at a checkpoint may electronically read the content of the Token, authenticate the Secure Element on the Token according to cryptographic practice and make a distinction between authentic and fraudulent Tokens.

Figure 2:
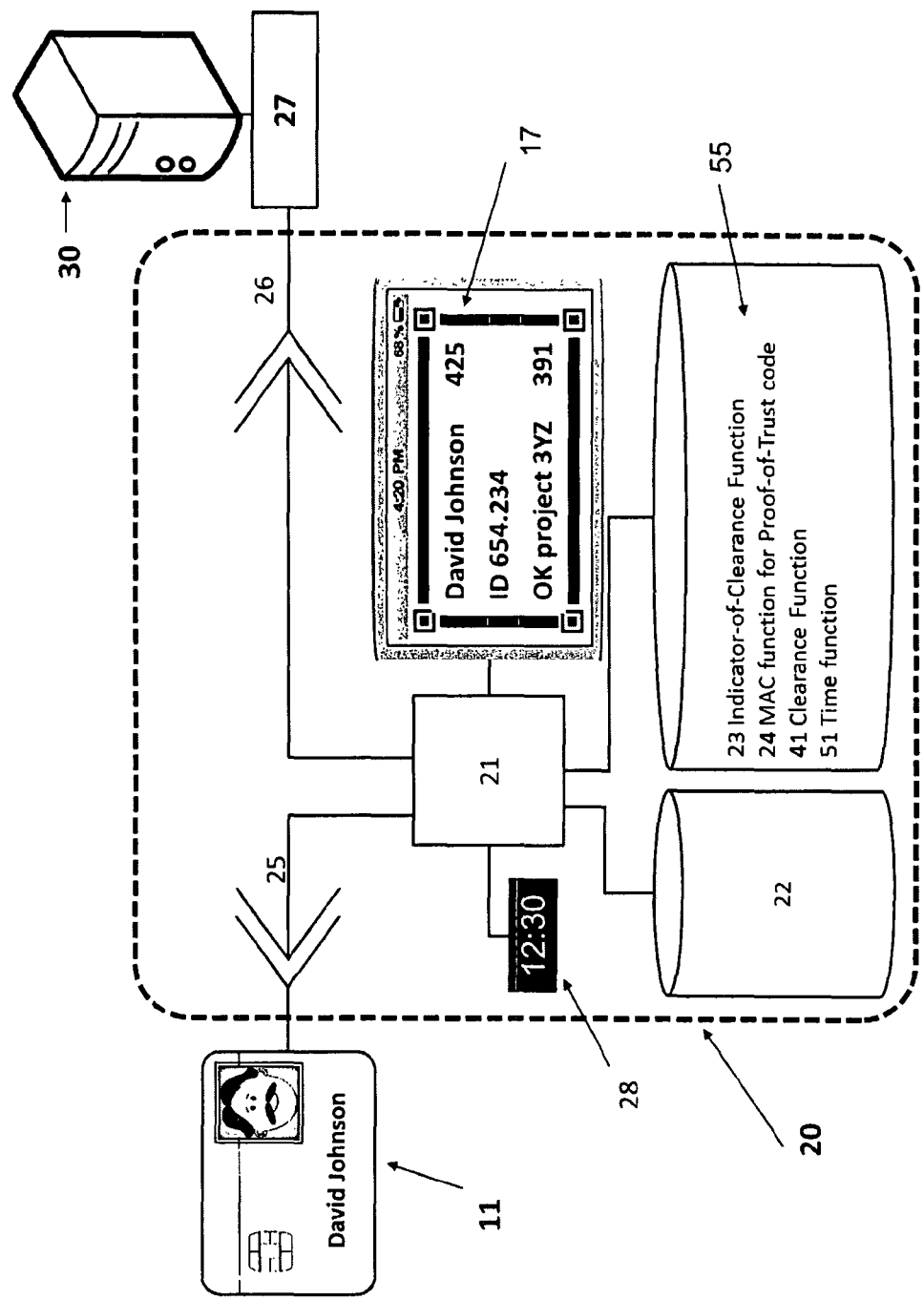
FIG. 2 presents a Validator Device for the validation and thus also the authentication of the information stored in a Token.

FIG. 2 presents a schematic description of a Validator device 20 according to embodiments of the present invention. The Validator 20 may be provided with communication interface 25 for interacting with the Token, which may be a wired or a wireless interface, which may be preferably secured using an encryption algorithm. A further communication interface 26 may also be provided for interacting through a Connector 27 with the Centralised System 30 of the Trust Authority, which may also be a wired or wireless communication interface depending on the security requirements. Preferably, the communication interface between the Connector 27 and the Centralised system 30 may also be over an end-to-end secure messaging channel and/or be secured using an encryption algorithm available in the art, such as public-key encryption or a symmetrical-key algorithm. Furthermore, the Validator 20 may further be provided with a processor unit 21 for processing information and a Secure Element 22 provided by the Trust Authority. The processor unit 21 may comprise stored software programs and a memory for storing the input and output data generated. Next to the processor unit 21, a specific signature or hash function may be stored in a secure and encrypted database 55 and used as a program on the processor unit 21, which is only known to the Trust Authority and referred to herein after as the Indicator-of-Clearance-Function 23. The Indicator-of-Clearance-Function 23 can be any function that for example transforms multiple input data in a single output result. However, the Indicator-of-Clearance-Function 23 must have at least one feature: the output should not be predictable, or at least not substantially predictable, as defined by cryptographic practice based on previous output results generated by the function and by previous input data during the time period in which the Validator may operate. Examples of such functions are signature functions or hash functions such as SHA-1, SHA-2 and SHA-3. To further increase the level of security, a further specific message authentication code (MAC) function 24 according to cryptographic practice may be stored in a secure and encrypted database 55, used as a program on the processor unit 21 and only known to the Trust Authority. The Validator 20 may also be provided with an internal clock 28 for synchronising events and a display 17 for displaying all or part of the Identification Data 43 stored in the Token and the authentication related information generated in the Validator 20. The part or subset of Identification Data stored in the Token to be displayed is referred to hereinafter as the Trust Data 45. The Trust Data 45 may be chosen by the Trust Authority issuing the Token, so that the displayed Trust Data 45 is sufficient to uniquely identify the Owner of the Token in a particular security environment. Examples of such displayed Trust Data 45 may be the license plate number of the car, the first and last name of a person 12, the ID number 13 of a person, and a project code assigned to a person 14.

Figure 3:
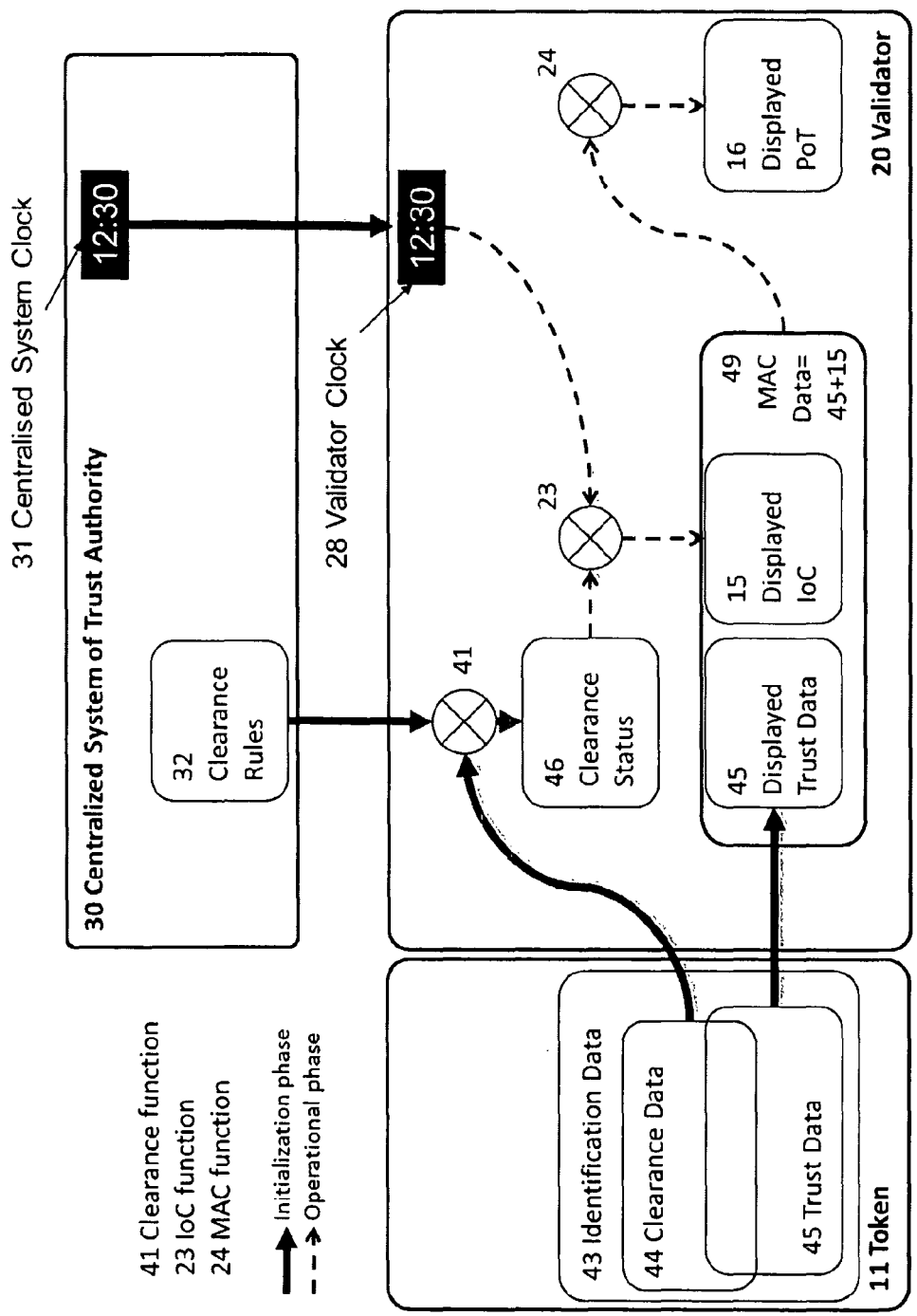
FIG. 3 shows a validation procedure with the data and calculation flow for validating information stored in a Token and calculating the IoC and PoT codes.
Figure 4:
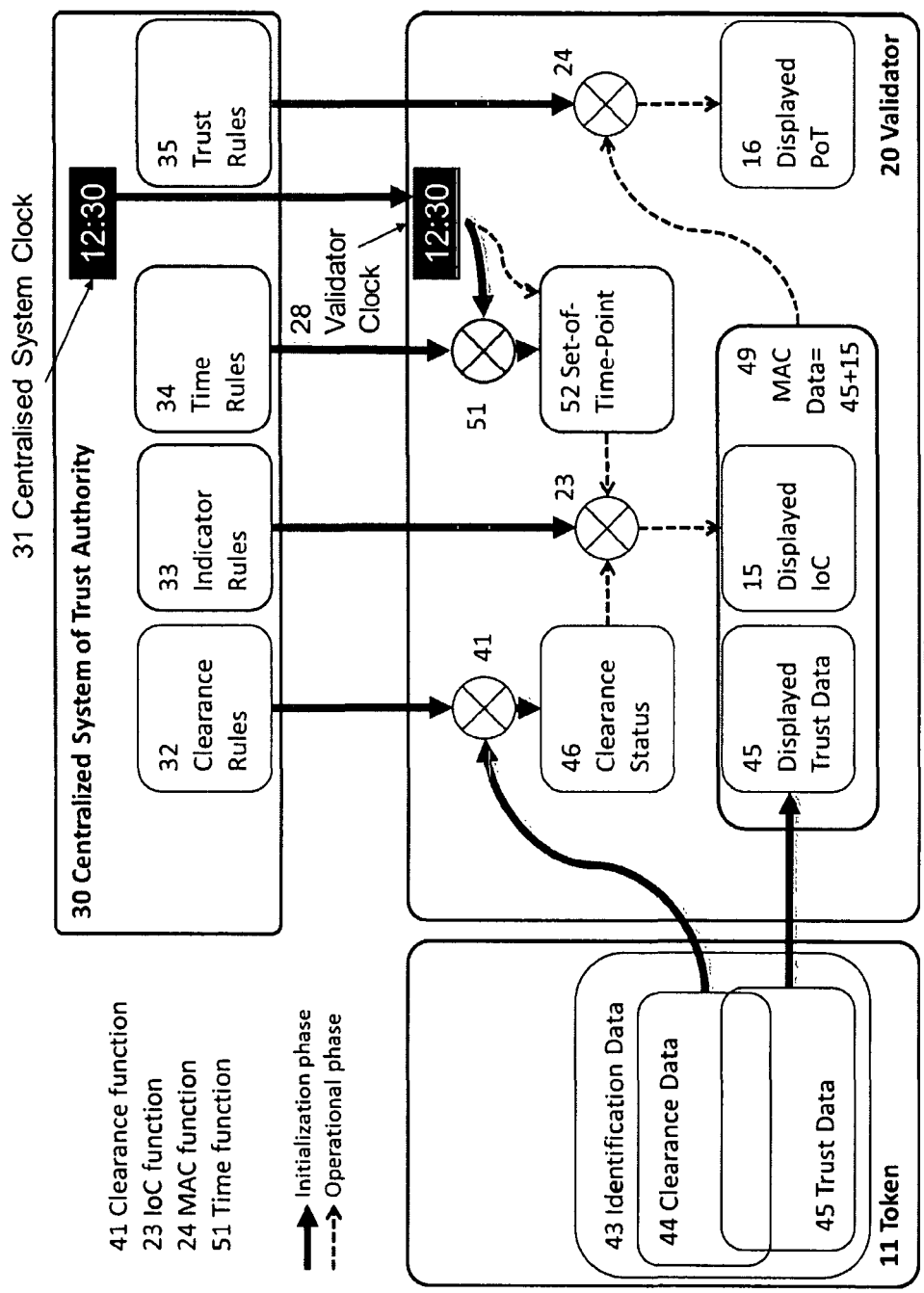
FIG. 4 shows a further validation procedure with the data and calculation flow for validating information stored in a Token and calculating the IoC and PoT codes.

In the case where a Token 11 claims to be part of a Set-of-Valid-Tokens, a Validator device 20 may be used in combination with this Token 11 so that authentication and validation of the information stored therein can be carried out. The Validator 20 may follow an Initialization Phase to authenticate the Token 11 and collect the data from the Token 11 and from the Centralised System 30, which collection of data is preferably secured through an end-to-end secure messaging channel and/or using an encryption algorithm available in the state of the art. An example of an Initialization Phase of the Validator is shown in FIGS. 3 and 4, which Initialization Phase is represented by the solid arrows. This initialization phase, hereinafter referred to as the Initialization Phase, may start by presenting the Token 11 to the Validator 20 so that the Validator 20 may access the Secure Element of the Token 11 through the communication interface 25 to authenticate the Token 11. The Validator 20, once communication with the Token has been established, may start reading the Identification Data 43 stored in the Token through the wired or wireless communication interface 25, such Identification Data 43 may further include the Clearance Data 44 and Trust Data 45. The Validator 20, preferably at that time, may further be connected to the Centralised System 30 belonging to the Trust Authority such as a governmental or a private organisation. A Connector device 27 may be used to establish such a wired or wireless communication interface 26, to enable the transfer of data between the Validator 20 and the Centralised System 30 through the Connector 27 in a fully secure and confidential manner. Preferably, the transfer of data is secured through an end-to-end secure messaging channel and/or using an encryption algorithm available in the state of the art. The Centralised System 30 may first start to authenticate the Secure Element 22 of the Validator 20 through the Connector 27. The Connector 27 may also contain a Secure Element so that the Trust Authority can verify the authenticity of, i.e. authenticate, a Connector 27 at any point in time. Examples of Connector Devices 27 are contact card readers or proximity badge readers arranged to transfer the data information via the communication link established by the Connector 27 with the Centralised System 30. The data information transferred from the Centralised System 30 to the Validator 20 may comprise a clock synchronization signal for synchronizing the Validator clock 28 to the clock of the Centralized System 31. Through the clock synchronisation signal, all Validators 20 used to verify a Set-of-Valid-Tokens may be synchronized with the same clock of the Centralized Clock 31 of the Trust Authority. Moreover, the Centralized System 30 may transfer, preferably securely and/or through an end-to-end secure messaging channel, different sets of data to the Validator 20, such as Clearance Rules 32 and optionally Time Rules 34, as shown in FIG. 4. These sets of data may be identical for all Validators used to verify Tokens that are member or want to become members of the specific Set-of-Valid-Tokens.

Next, the Validator may then apply the Clearance Rules 32 to the Clearance Data 44 of the Token 11 through, for example, a Clearance Function 41 to determine a Clearance Status 46. The Clearance Function may be stored in a secure and encrypted database 55 and used as a program on the processor unit 21. The Clearance Rules 32 may be in the form of criteria imposed by the Centralised System 30 to verify the Clearance Data 44 in a Token and based on which a particular valid Clearance Status 46 of the Token may be determined. For example, the Clearance Rules 32 might stipulate that the Clearance Data 44 of a Token should at least contain one job title from a list of job titles in order to give the Owner of the Token a valid Clearance Status 46 that allows him for example to perform a certain action and/or be in a specific location and/or during a certain amount of time. In specific embodiments of the present disclosure, the Clearance Rules 32 may be transferred to the Validator 20 and the Clearance Status 46 may be generated by the processor unit 21 of the Validator 20 using the Clearance Function 41 by applying the Clearance Rules 32 to the Clearance Data 44 stored in the Token. In further embodiments, the Centralised System 30 may generate the Clearance Status 46 by transferring the Clearance Data 44 of the Token 11 to the Centralised System 30 through the Connector 27, and sending the resulting Clearance Status 46 back to the Validator 20 through the Connector 27.

Based on the collected data, the Validator 20 may define a set of time intervals, referred to as Set-of-Time-Points 52, at which the Validator 20 may generate and display authentication and validation related information. The Set-of-Time-Points 52 may be determined with a Time Function 51 using as input the Time Rules 34 and the time defined by the internal Validator clock 28. The Time Function may be stored in a secure and encrypted database 55 and used as a program on the processor unit 21. Because the Validator clock 28 and the Time Rules 34 may be identical for all Validators in use for a Token that claims to be part of a specific Set-of-Valid-Tokens, the Set-of-Time-Points 52 may also be equal on all Validators 20. For example, the Times Rules 34 may define that authentication related information must be calculated and displayed every 5 seconds of the current calendar day, for example May 18, 2013 according to GMT starting at 0h00 04'. The Set-of-Time-Points 52 is then 0h00 04', 0h00 09', 0h00 14', up to 23h59 59', all during May 18, 2013 GMT. In a further example, the Time Rules 34 may define that authentication related information must be calculated and displayed starting at 18h00 on May 18, 2013 GMT and increased with time intervals X whereby X is a set of natural numbers contained in the Time Rules. When X is for example 17, 12, 3, etc. then the Set-of-Time Points are 18h00 00', 18h00 17', 18h00 29', 18h00 32', etc., all during May 18, 2013 GMT.

Once all required data have been transferred between the Validator 20 and the Centralised System 30 and between the Validator 20 and Token 11, and once the above mentioned tasks are executed, the Initialisation Phase may be closed and the Validator may enter the Operational Phase. An example of the Operational Phase of the Validator is shown in FIG. 3 and FIG. 4 and is represented by the dotted arrows. The IoC code 15 may then be generated by the Indicator-of-Clearance-Function 23 programmed on the Validator processor unit 21 based on the Clearance Status 46 calculated during the Initialisation Phase and the status of the Validator clock 28 and/or, optionally, a specific time point of the Set-of-Time-Points 52 determined by the status of the Validator clock 28. The IoC code 15 may be indicative of the type of Clearance Status 46 assigned to the Token Owner in accordance with the Clearance Rules 32 imposed by the Trust Authority. Because the valid Clearance Status 46, the status of the Validator Clock and the Set-of-Time-Points 52 may be identical for all Validators 20 for a specific Set-of-Valid-Tokens, the IoC code 15 may also be identical for all Tokens 11 satisfying a specific set of Clearance Rules 32 during the time interval for which a Set-of-Time-Points 52 exits, thereby facilitating the detection and prevention of invalid Tokens.

The IoC code 15 may be displayed on the display 17 of the Validator at the exact specific time point for which it is calculated. The IoC 15 is displayed next to the displayed Trust Data 45.

By displaying the IoC code 15 that may be identical for all Token Owners having the same valid security clearance, a social control scheme may be implemented. This scheme may rely on independent observers, for example Token Owners working in the same security clearance area, to notice that the IoC code 15 displayed on a Validator 20 linked to an invalid Token does not correspond to the one displayed on the Validators 20 of the rest of the Tokens 11 and report any abnormality to a responsible authority. Because the IoC codes 15 synchronously switch on all the Validators 20 of the Set-of-Valid-Tokens to an unpredictable new IoC code 15 at each time point of the Set-of-Time-Points 52, fraud may be easily detectable at each time point. For example, a fraudulent party who cannot calculate the next IoC 15 can only copy that IoC 15 once it becomes visible on the Validators 20 of Tokens 11 from the Set-of-Valid-Tokens. This party must then, at each point in time of the Set-of-Time-Points 52 copy this new IoC 15 and get it on the display of his fake Validator. Although this type of fraud is possible, it is complex to implement, unreliable at all time points and may always have a time delay that is detectable by an independent observers.

In order to increase further the security measures, an Animated Indicator-of-Clearance Transition may also precede the display of a new IoC code or may start to appear concurrently with a new IoC code. The Validator may then contain for example a database with a different 5-seconds animation for each potential IoC code. This animation might include coloured blocks and symbols that might move over the display of the Validator. The database is identical on all Validators used for Tokens that claim to be part of a Set-of-Valid-Tokens.

Because the new IoC code may be the same on every Validator of a Set-of-Valid-Tokens, the same Animated IoC Transition will synchronously appear on all Validators of a Set-of-Valid-Tokens. As the animation covers the whole display of the Validator, the social control scheme is even more visible from a remote distance. Therefore, use of an invalid Token may become even more difficult as a fraudulent party would have to mimic an unpredictable animation on his own fake Validator synchronously with all Validators of the Set-of-Valid-Tokens.

In order to increase further the security measures, the processor unit of the Validator 20 may further generate the PoT code 16. The PoT code 16 is generated by a Message Authentication Code (MAC) function 24 programmed on the Validator processor unit using as input the MAC Data 49 comprising, preferably consisting of, the Displayed Trust Data 45 and the displayed IoC code 15 all shown on the Validator display 17. The PoT code 16 may be uniquely different for each Token 11 and may be used to verify whether all information shown on the Validator display 17 may be authentic. This is because, the PoT code 16 is based on the displayed IoC code 15 and the displayed Trust Data 45, that may be different for each Token Owner. The MAC function 24 programmed in the processor unit 21 may be implemented by any of the MAC algorithms defined in up to date authentication and/or cryptography practices, such as currently 3D-MAC, AES-MAC and H-MAC Therefore, by using the Identification Device 10 of the present invention, even if a fraud perpetrator is able to copy a correct IoC 15 from a Validator 20 from the Set-of-Valid-Tokens and even if he succeeds in displaying this IoC 15 instantly on the display of his fake Validator 20, he may not be able to display the correct PoT code 16 if he does not have the correct MAC Function 24. Because this function may only be known to the Trust Authority, the fraud perpetrator will not be able to get hold of the correct MAC function 24, thereby he will not be able to generate the correct PoT 16, except by chance. In addition, the IoC code 15 may change at each time point of the Set-of-Time-Points 52. This preventative measure may have as an effect that the IoC code 15 and the PoT code 16 may be re-generated by the Validator processor unit 21 at each time point of the Set-of-Time-Points 52. The regeneration of the IoC code 15 may also result in the regeneration of the PoT code 16, making the use of invalid Tokens in a security environment even more infeasible.

For example, in the case where an invalid Token is presented to the Validator 20, it will become immediately apparent that it is not valid since the IoC-code 15 and PoT-code 16 displayed in the Validator display 17 will not be correct or not generated at all, thereby indicating an invalid Token.

The Trust Authority may be arranged to identify invalid Tokens and/or invalid Validators. This may be possible by re-generating the IoC 15 and PoT code 16 for each Validator based on the Indicator-of-Clearance-Function 23, the MAC function 24, the required Clearance Status 46 and the Time Rules 34 which are all known by the Trust Authority. The Trust Authority can thus independently control if the IoC-code 15 and PoT-code 16 displayed on any Validator 20 are correct based on the displayed Trust Data 45. Because the IoC 15 and PoT 16 codes are visible on the display 17, they may be visually checked such that, when the display is visibly positioned by the Owner, the Validator 20 and Token 11 can be checked without having to approach the Owner. Moreover, by displaying the Trust Data 45, the IoC code 15 and the PoT code 16, a large number of Tokens 11 may be checked from a distance.

Figure 10:
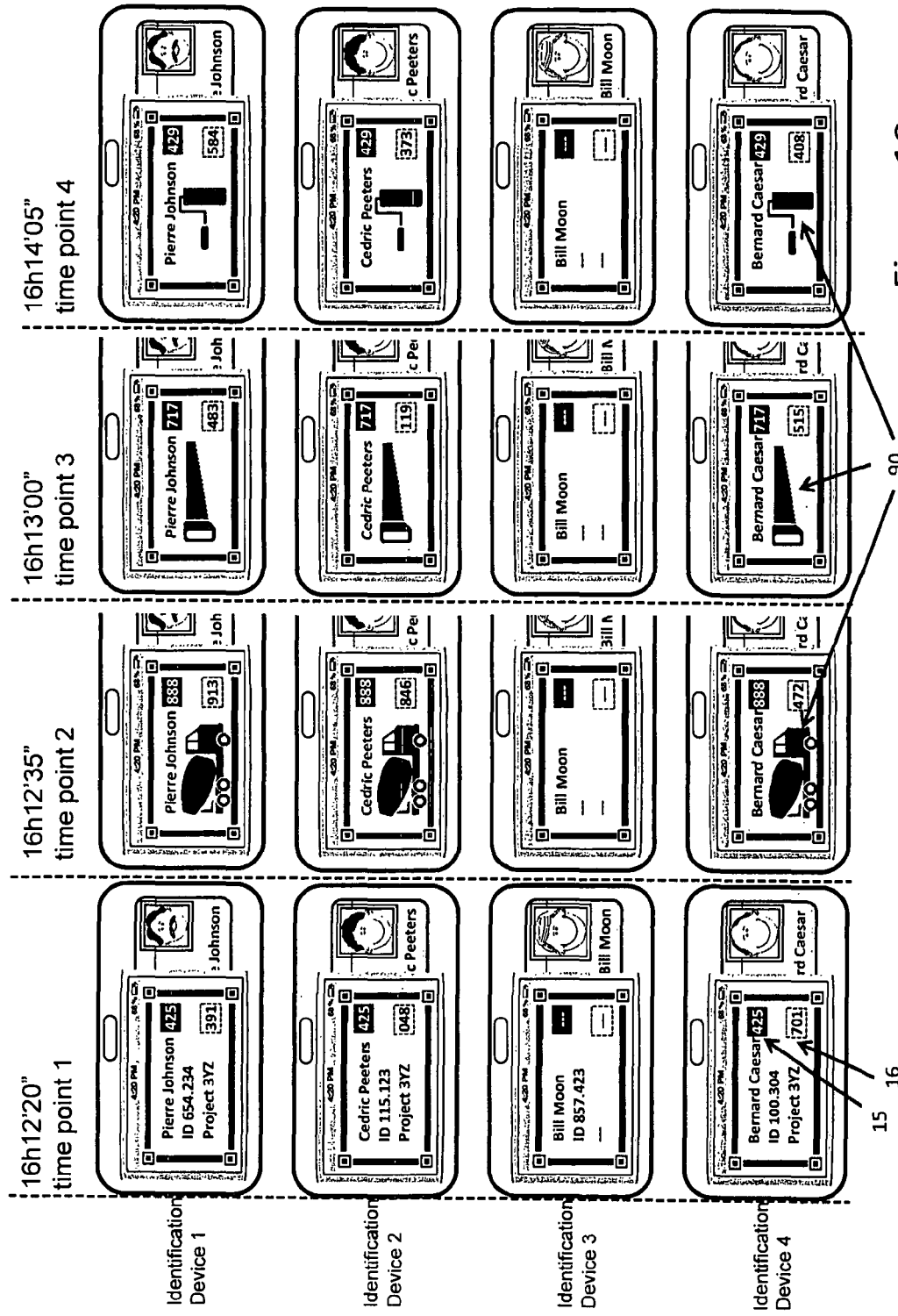
FIG. 10 shows an overview of what different Identification Devices show in function of time.

FIG. 10 is an example of the user experience with multiple Identification Devices during a period of time in the Operational Phase. In this example, the Tokens are smartcards and the Owners are persons. Identification Devices 1, 2 and 4 have, valid Tokens while Identification Device 3 has an invalid Token. The Set-of-Time-Points has been calculated and FIG. 10 shows the visible elements of the Identification Devices starting at 4 time points: 16h12'20", 16h12'35", 16h13'00" and 16h14'05". At each time point, the IoC 15 and PoT 16 is displayed. The IoC 15 is displayed as a white 3-digit number in a black box while the PoT 16 is displayed as a black 3-digit number in a white box with a dotted outline. In addition, at time point, 1 the display shows also a set of Trust Data from the Identification Data while at time point 2, 3 and 4 a different set of Trust Data from the Identification Data is shown in combination with an Animated Indicator-of-Clearance Transition 90, with here as example a truck at time point 2, a saw at time point 3 and a paint roller at time point 4.

As can be clearly seen, the IoC 15 and the Animated Indicator-of-Clearance Transition 90 is at every point in time equal for Identification Devices 1, 2 and 4 and the display of the next IoC 15 will always be unpredictable. In contrast, the display of the Identification Device 3 is different. As a result, a strong scheme of social control is established in which Identification Device 3 will be constantly visible as an invalid device. The person wearing Identification Device 3 will also not be able to create the next IoC 15 to be displayed as the next IoC 15 is unpredictable and as the PoT 16 is an additional protection against fraud.

In addition, if the Identification Devices are equipped with a Biometric Reader, as will be further explained later, then it becomes also impossible for one person to wear the Identification Device of another Owner. In this case, the displays of FIG. 10 also guarantee that the Identification Devices 1, 2 and 4 are attached to the correct Owners 1, 2 and 4. In contrast, even if Identification Device 3 with a biometric reader contains a valid Token, when this device is attached to a person that is not equal to Owner 3, the display will show the same content as on FIG. 10, thereby indicating that the person carrying Identification Device 3 is not validated by the Trust Authority.

In the case where an invalid Validator device is used for authentication, such a device may not be able to connect to the Centralised System 30, thereby an invalid Validator device would not be able to obtain the required information such as the Time Rules 34, Clearance Rules 32, etc. As a result the codes displayed may either be wrong, e.g. random data, or may not change at predetermined intervals defined by the Time Rules.

To further increase the security measures, Indicator Rules 33 may be further imposed by the Centralised system 30 and transferred, preferably securely and/or through an end-to-end secure messaging channel, to the Validator 20 at the Initialization Phase to be used by the Indicator-of-Clearance Function 23 for the generation of IoC codes 15. The Indicator Rules 33 can be a set of confidential rules determined by the Centralised System 30, which may for example only be valid for a predefined time period of the Set-of-Time-Points, e.g. a predefined period until the end of a working day. Using the Indicator Rules 33, the Trust Authority may allow for the Indicator-of-Clearance Function 23 to become public while maintaining the Indicator Rules secret. As a result, if an instance of the Indicator Rules become known to the public, it would be sufficient for the Trust Authority to generate a new set of secret Indicator Rules 33 for a new time period to ensure that the Proof-of-Trust System is again reliable, thereby adding a further security feature in the Validator 20 for detecting the use of invalid Tokens. The Indicator Rules 33 are identical on all Validators 20 for Tokens 11 that are or want to become members of a Set-of-Valid-Tokens, thereby ensuring that the IoC is calculated in the same manner on all these Validators.

The combination of Indicator Rules 33 with an Indicator-of-Clearance Function may be exemplified by a Validator device, which uses a hash function as an Indicator-of-Clearance Function 23 with a 3 digit output. For example, the Indicator Rules 33 may be equal to a single random 100 digit number generated by the Centralize System 30, which may be equal on all Validators 20 used for a specific Set-of-Valid-Token. As a result, the IoC 15 would be generated by the hash function based on the calculated Clearance Status 46, the 100 digit random number and a specific time point from the Set-of-Time-Points 52.

Furthermore, in order to further increase the level of security, Trust Rules 35 may be further imposed by the Centralised system 30 and transferred, preferably securely and/or through an end-to-end secure messaging channel, to the Validator 20 at the Initialization Phase to be used by the MAC function 24 for the generation of PoT codes 16. Similarly as the Indicator Rules 33, Trust Rules 35 can be used as input of the MAC Function 24 programmed in the Validator processor 21 to generate the PoT-code 16. The Trust Rules 35 can be a set of confidential rules determined by the Centralised System 30, which may for example only be valid for a predefined time period of the Set-of-Time-Points, e.g. a predefined period until the end of a working day. Using the Trust Rules 35, the Trust Authority may allow for the MAC Function 24 to become public while maintaining the Trust Rules secret. As a result, if an instance of the Trust Rules become known to the public, it would be sufficient for the Trust Authority to generate a new set of secret Trust Rules 35 for a new time period to ensure that the Proof-of-Trust System is again reliable, thereby adding a further security feature in the Validator 20 for detecting the use of invalid Tokens. The Proof-of-Trust Function may include cryptographic MAC functions with a secret key in which case the Trust Rules 35 may include a secret key for those cryptographic MAC functions 24. The Trust Rules 35 are identical on all Validators 20 for Tokens 11 that are or want to become members of a Set-of-Valid-Tokens, thereby ensuring that the PoT is calculated in the same manner on all these Validators.

According to embodiments of the present invention, all communication interfaces between the components of the Proof-of-Trust system may be physically wired when information has to be exchanged between the components avoiding the use of a wireless network at any stage of this embodiment of the present invention. In this case the Validator communication interfaces 25 and 26 used to communicate with the Token 11 and the Connector device 27 may be a wired interface. For example, the Token 11, Validator 20 and the Connector 27 may be provided with physical contacts for this purpose. Therefore, for transferring data between different devices, a physical contact may be created between the different devices. This physical contact may be of a short time period (e.g. less then 1 second) and may serve to transfer the data required to execute and close the Initialisation Phase. Once Validators or Controllers enter their Operational Phase, the wired interface may be interrupted. Furthermore, the Connectors 27 may further be physically connected with the Centralised System 30 through a wired network.

Alternatively, communication interfaces between the components of the Proof-of-Trust system can also be over a secure wireless network during the Initialisation Phase when information may be exchanged between the different components of the system. For example, such a communication interface may be realised by means of Near Field Communication (NFC), Bluetooth, etc. In this way communication can be established remotely. Once Validators or Controllers enter their Operational Phase, the wireless network connection may be interrupted.

The Centralized System 30 may be provided with a Connector device(s) 27 and may contain a Centralised System clock 31 to which all devices in the Proof-of-Trust System may be synchronised. The Connector may be adapted to interact with the Validator communication interface 26 to transfer data between the Validator 20 and the Centralized System 30. The Centralised System 30 may be used by a Trust Authority to provide information to the Validator 20 through the Connector 27 transferred through a secure communication channel established by the Connector 27. Furthermore, the Connector device 27 may be adapted to transfer data, preferably securely and/or through an end-to-end secure messaging channel and/or using an encryption algorithm, such as Time Rules 34 and Clearance Rules 32 specifying whether the Clearance Data 44 stored in the Token 11 indicates that the object or person is allowed to perform an action. The Connector device 27 may further be adapted to transfer the Indicator Rules 33 and/or Trust Rules 35.

The Centralised System 30 may be stored in a server located in the vicinity of the Trust Authority, or may be stored in a server placed at a secure outsourced location under the supervision of the Trust Authority. Therefore, access to the information storied therein may only be limited to the Trust Authority.

Figure 5:
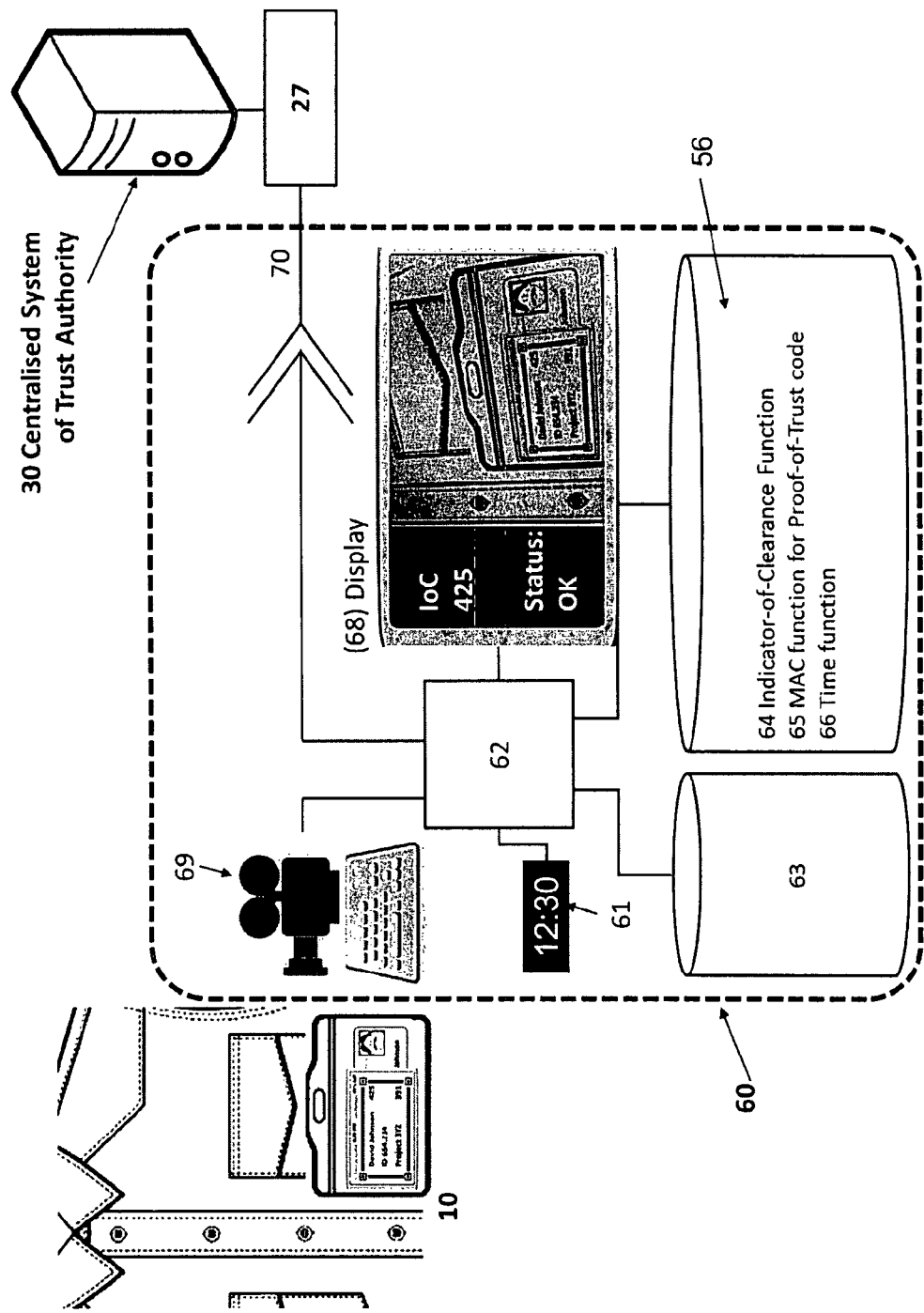
FIG. 5 shows a Controller device according to embodiments of the present invention.
Figure 6:
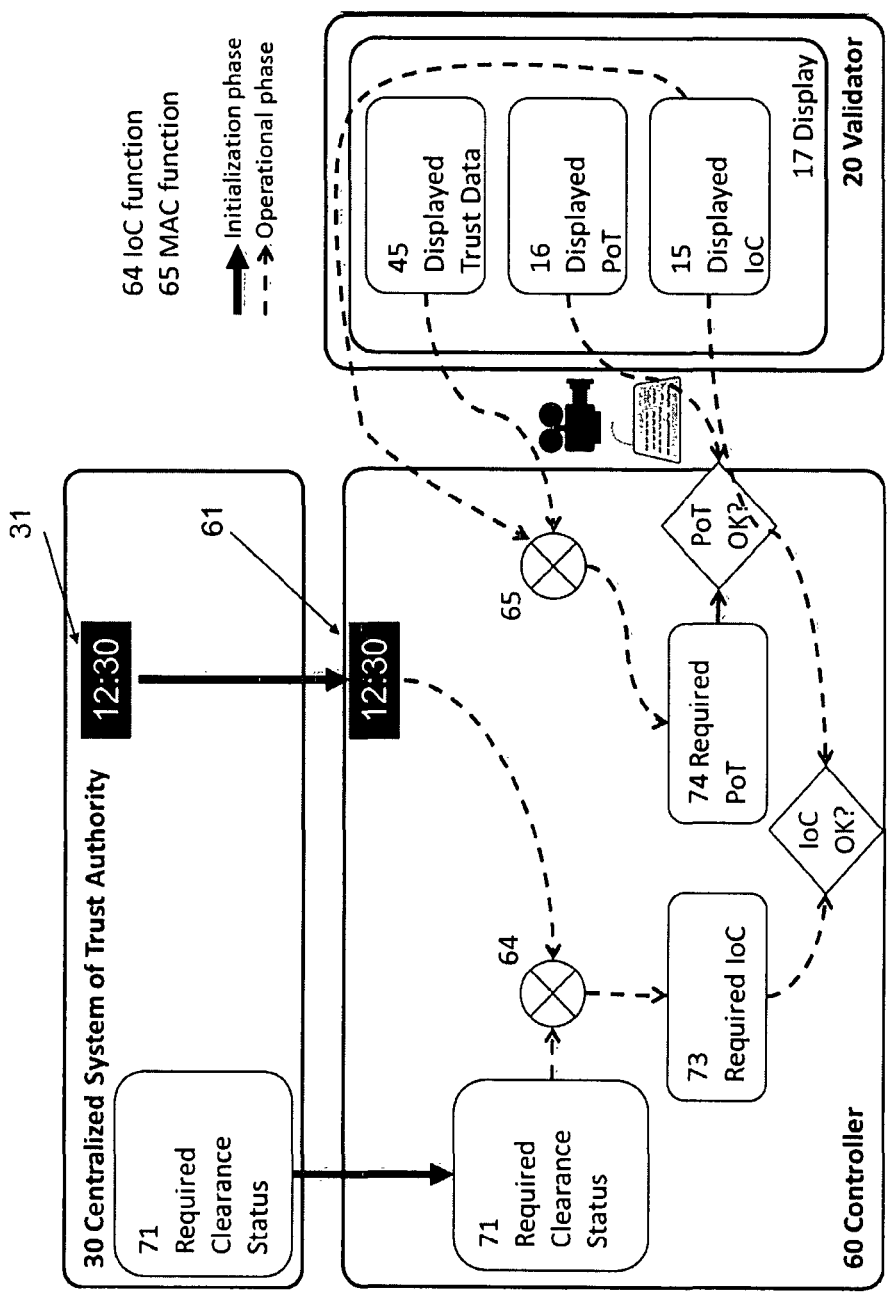
FIG. 6 presents a validation procedure with the data and calculation flow for validating the information displayed on the Validator display using a Controller device.
Figure 7:
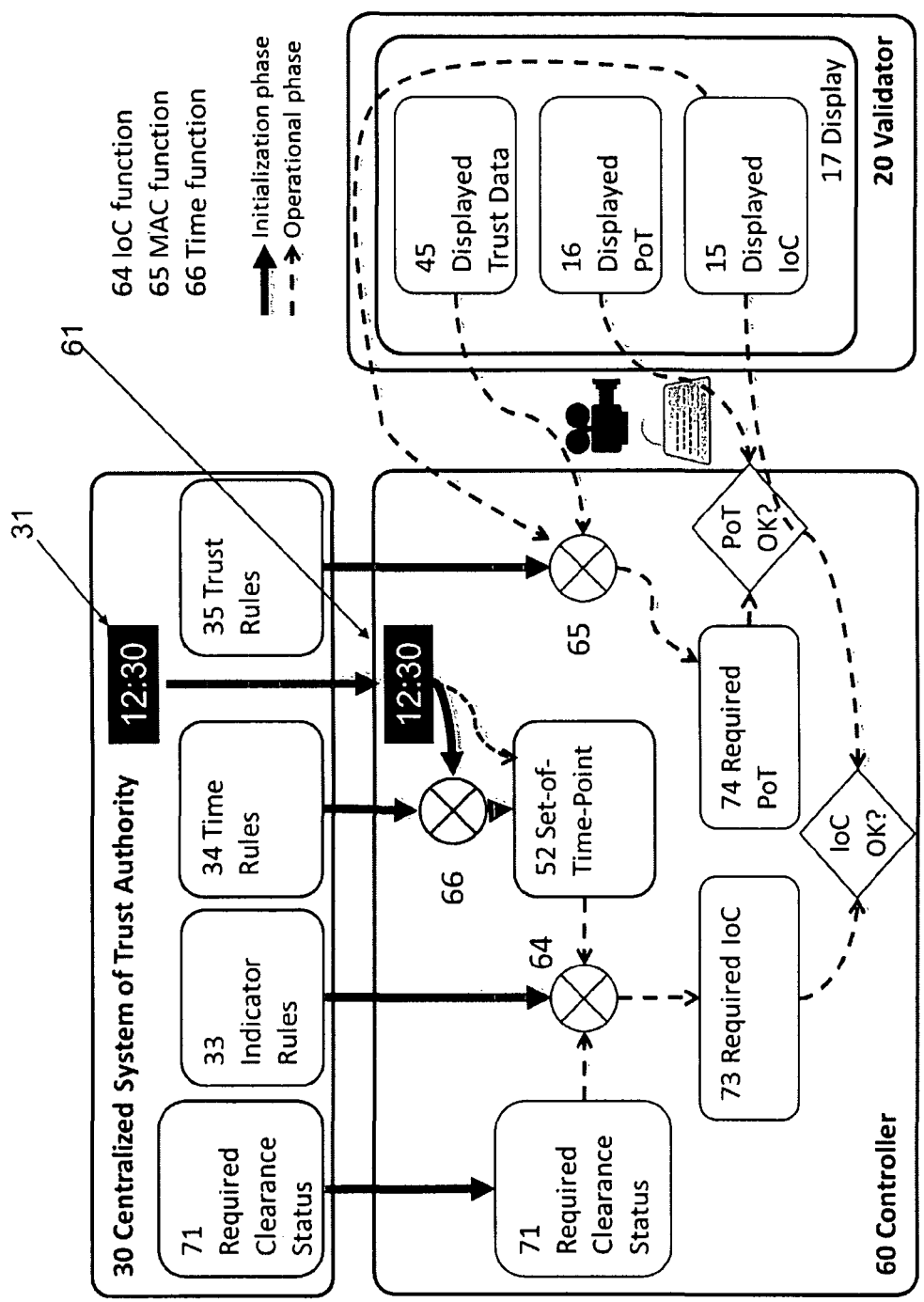
FIG. 7 presents a further validation procedure with the data and calculation flow for validating the information displayed on the Validator display using a Controller device.

In order to provide an easy authentication procedure having a high throughput, an electronic device may be provided by the Trust Authority to quickly control and authenticate the Validators and associated Tokens of a Set-of-Valid-Tokens, referred to hereinafter as a Controller 60. An example of a Controller 60 is shown in FIGS. 5, 6 and 7. The Controller allows the Trust Authority to delegate its controlling capability to any other party.

The Controller device 60 may be configured for checking the Trust Data 45, IoC code 15 and PoT code 16 visible on a large number of Validators 20 of Tokens 11 that are or are not member of a specific Set-of-Valid-Token. The Controller 60 may be provided with a display 68 for displaying information, with a processor unit 62 used for processing information, with stored software programs and with storage space for input and output data. A capturing device 69 may further be provided that can collect the information on the display of a Validator 20 and enter this information into the processor unit of the Controller 62, such as an OCR (Optical Character Recognition) camera or a keyboard. The Controller may further include an internal clock 61, a communication interface 70, which is preferably through an end-to-end secure messaging channel and/or secured using an encryption algorithm, to transfer data between the Controller 60 and the Centralized System 30 through a Connector 27. The communication interface 70 can be wired or wireless. The Controller 60 may have a Secure Element 63 that enables the Trust Authority to verify the authenticity of a Controller 60 at any point in time. The Controller may be adapted to generate a required IoC code 73 and a required PoT code 74 using an Indicator-of-Clearance Function 64 and a MAC function 65. The Controller 60 may also contain a Time Function 67 to calculate a Set-of-Time-Points. The Indicator-of-Clearance Function 64, the MAC function 65 and the Time Function 66 of the Controller are identical to the corresponding Indicator-of-Clearance Function 23 the MAC function 24 and the Time Function 51 on the Validators 20 of the Tokens that claim to be member of the Set-of-Valid-Tokens. The Indicator-of-Clearance Function 64, the MAC function 65 and the Time Function 66 may be stored in a secure and encrypted database 56 of the Controller and used as programs on the processor unit 62.

Prior to using the Controller 60 for authenticating and validating the information displayed on the Validator display 17, an Initialisation Phase represented by the solid arrows may be initiated as shown in FIGS. 6 and 7. During this Initialisation Phase, the Controller 60 may transfer, preferably securely and/or through an end-to-end secure messaging channel, the required information from the Centralised System 30 for authenticating and validating the information displayed on a Validator display 17. The Controller may first be connected to the Centralised System 30 belonging to the Trust Authority through a Connector 27 preferably in a fully secure and confidential manner. Through the Connector 27 a set of data may be transferred, which may comprise a clock synchronization signal for synchronizing the Controller clock 61 to the clock of the Centralized System 31. The Centralized System 30 may further transfer, preferably securely and/or through an end-to-end secure messaging channel, the required Clearance Status 71 and, if applicable, the Time Rules 34, the Indicator Rules 33 and/or the Trust Rules 35. This information is identical to the ones transferred to the Validators of the Tokens that claim to be member of a Set-of-Valid-Tokens. Therefore, based on the Time Rules 34 and the Time Function 66, the Controller 60 may generate the same Set-of-Time-Points 52 as the Validators that are used for the Set-of-Valid-Tokens.

After this Iinitialisation Phase, the Controller enters the Operational Phase which is represented by the dotted arrows in FIGS. 6 and 7. Using the required Clearance Status 71 and, if applicable, the Indicator Rules 33 and the Set-of-Time-Points 52 as input, the Indicator-of-Clearance Function 64 programmed on the processor unit 62 of the Controller 60 may re-generate the required IoC code 73 which should be the same as the IoC code 15 visible on all Validators of Tokens that are member of a Set-of-Valid-Tokens at a given time point, The Controller 60 may now proceed with the validation of the information displayed on a Validator display 17. The validation procedure may be performed by first capturing the data visible on the display 17 of the Validator 20, namely the visible Trust Data 45, the visible IoC code 15 and the visible PoT code 16. This captured data may then be used as an input to the processor unit 62 of the Controller 60.

The processor unit 62 of the Controller 60 compares the displayed IoC 15 with the required IoC 73 at the time point that the Controller 60 executes the control. If they match, the Identification Device 10, including the Validator 20 and the Token 11, may be considered as valid and the Controller 60 may display the comparison results on the Controller display 68.

The processor unit 62 of the Controller 60 may further calculate the required PoT 74 by using as input the displayed Trust Data 45, the displayed IoC code 15 and, if applicable, the Trust Rules 35 in the MAC function 65. The required PoT 74 generated by the processor unit 62 of the Controller may then be compared with the displayed PoT 16 of the Validator 20. In the case where the PoT codes 16 and 74 match, the Identification Device 10, including the Validator 20 and the Token 11, may be considered as authentic. The Controller 60 may further display the results of such PoT comparison on the Controller display 68.

Through these steps, the Controller may execute an extended verification of an Identification Device 10: if both IoC codes 15 and 73 and PoT codes 16 and 74 match, the Identification Device 10 may be valid and authentic; if the PoT codes 16 and 74 match but the IoC codes 15 and 73 do not match, the Identification Device is authentic but not valid; if the PoT codes 16 and 74 do not match, the Identification Device 10 is not authentic, in other words fake, and also not valid, independent of the results of the IoC codes 15 and 73 comparison.

In the case where one or both security codes displayed in the Validator 20 are not correct, a further check may be performed by a close up inspection using a Controller 60 adapted to communicate with the Token 11, such a device may include a mobile phone that is NFC compatible and that has an applet with the functionalities of a Controller.

An integrated Proof-of-Trust System for authenticating the information stored in a Token may be formed comprising a Centralised System 30 of a Trust Authority, Identification Devices 10 comprising Tokens 11 and Validators 20, Connectors 27 and Controllers 60 according to embodiments of the present disclosure.

By using such a Proof-of-Trust System, most type of fraud, invalid use or falsified use of a Token may be identified in a quick, consistent and continuously visible manner. The use of the Proof-of-Trust System may be exemplified in the following situations:

In the case where a valid Validator is used in combination with an authentic Token that does not have the required Clearance Data, the Validator will identify the Token as invalid and show no valid data, for example an invalid IoC but a valid PoT on its display, thereby enabling social control from all Owners of valid Tokens. In this case the Controller can identify the Validator as invalid but as authentic, and thus not as, fake.

In a further example, where a valid Validator is used in combination with a Token having fake visible data on the Token and an fake chip, the Validator will identify the Token as fake. Therefore, in the Validator display no valid IoC code and no PoT code will be shown, thereby enabling social control from all Owners of valid Identification Devices. In this case the Controller will identify the Identification Device as containing a non authentic, fake component.

In yet another example, the use of a fake Validator showing fraudulent Identification Data and a random IoC and random PoT, will be identified by the Controller as invalid and not authentic because the IoC code and the PoT code of this Validator will be different from the one calculated by the Controller except by chance. This also enables social control from all Owners of valid Tokens with authentic Validators.

In another example, the use of a fake Validator showing fraudulent Identification Data, an IoC code which is instantly copied from a valid Validator from the Set-of-Valid-Tokens and a random PoT, will be identified by the Controller as not authentic and thus fake.

in yet another example, a real Validator device may be combined with a real Token stolen from its Owner. The Token is stolen before the Validator and Token passed the Initialisation Phase and the Token Owner has announced the Token as stolen to the Trust Authority. In this case, the Token will be recognized as stolen at the next Initialisation Phase and blocked for further use. The Validator will then identify the Token as blocked and show for example no valid data, no IoC but a correct PoT on its display, enabling social control from all Owners of valid Tokens. Therefore, the Controller will identify the Validator as invalid but authentic.

In a further example, a real Validator device may be combined with a real Token stolen from its Owner. The Token may be stolen after the Token passed the Initialisation Phase or the Owner did not announce the Token as stolen to the Trust Authority. Furthermore, the ID-photo of the Owner may be stored in the Token and is shown in the display of the Validator. As a result, the ID-photo shown on the display of the Validator will be different from the person carrying the Validator and Token, enabling social control to identify the person carrying the Validator as different from the Owner.

In another example, a real Validator device may be combined with a real Token stolen from its Owner. The Token was stolen after the Token passed the Initialisation Phase or the Owner did not announce the Token as stolen to the Trust Authority. The ID-photo of the Owner is not shown in the display of the Validator. A fake ID-photo may therefore be printed on the Token. In this case, in order to avoid this type of fraud, it is recommended that the Trust Authority shows the ID-photo contained in the memory of the Token on the display of the Validator. The Token will also be blocked once the Trust Authority knows that the Token is stolen. Moreover, the photo can be part of the Trust Data such that when a fake ID-photo is printed onto the Token, the PoT code will no longer be correct, making the fake Identification Device 10 detectable. Another solution to this type of fraud is a Validator 20 equipped with a Biometric Reader 80.

In yet another example, a fraud perpetrator is able to create a fake Owner of a Token in the Centralised System, to obtain a real Validator and to generate an associated technical real Token with fake Clearance Data. In this case, the fraud is not detectable. However, this type of fraud is not feasible if the Trust Authority is organised and implemented according to standard good practice in cryptography.

Figure 8:
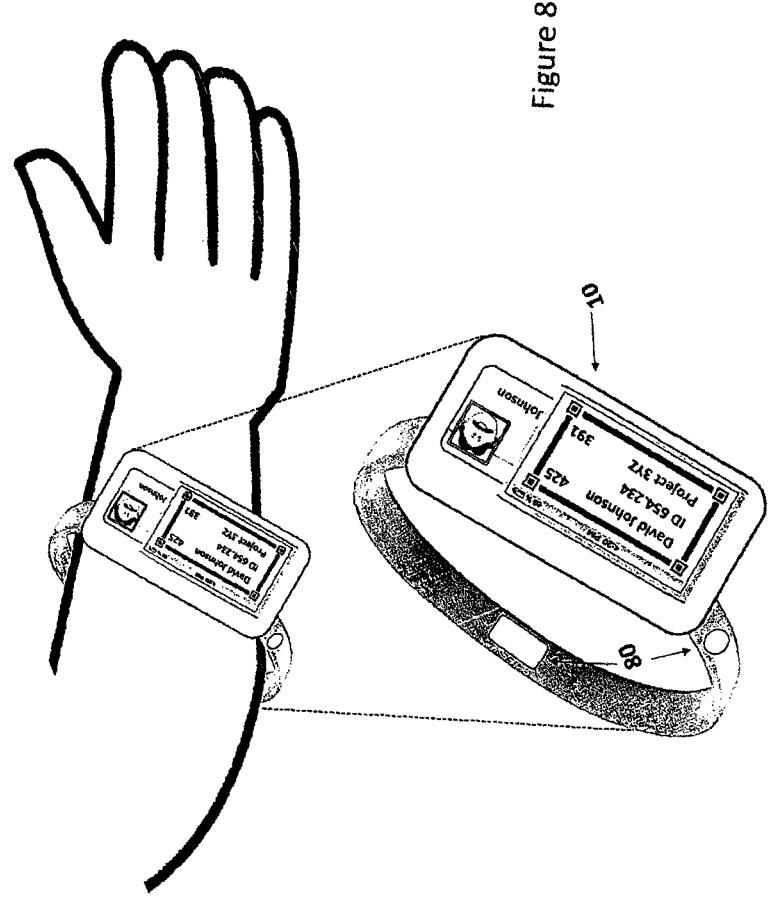
FIG. 8 shows an Identification Device where the Validator is further provided with a Biometric Reader.
Figure 9:
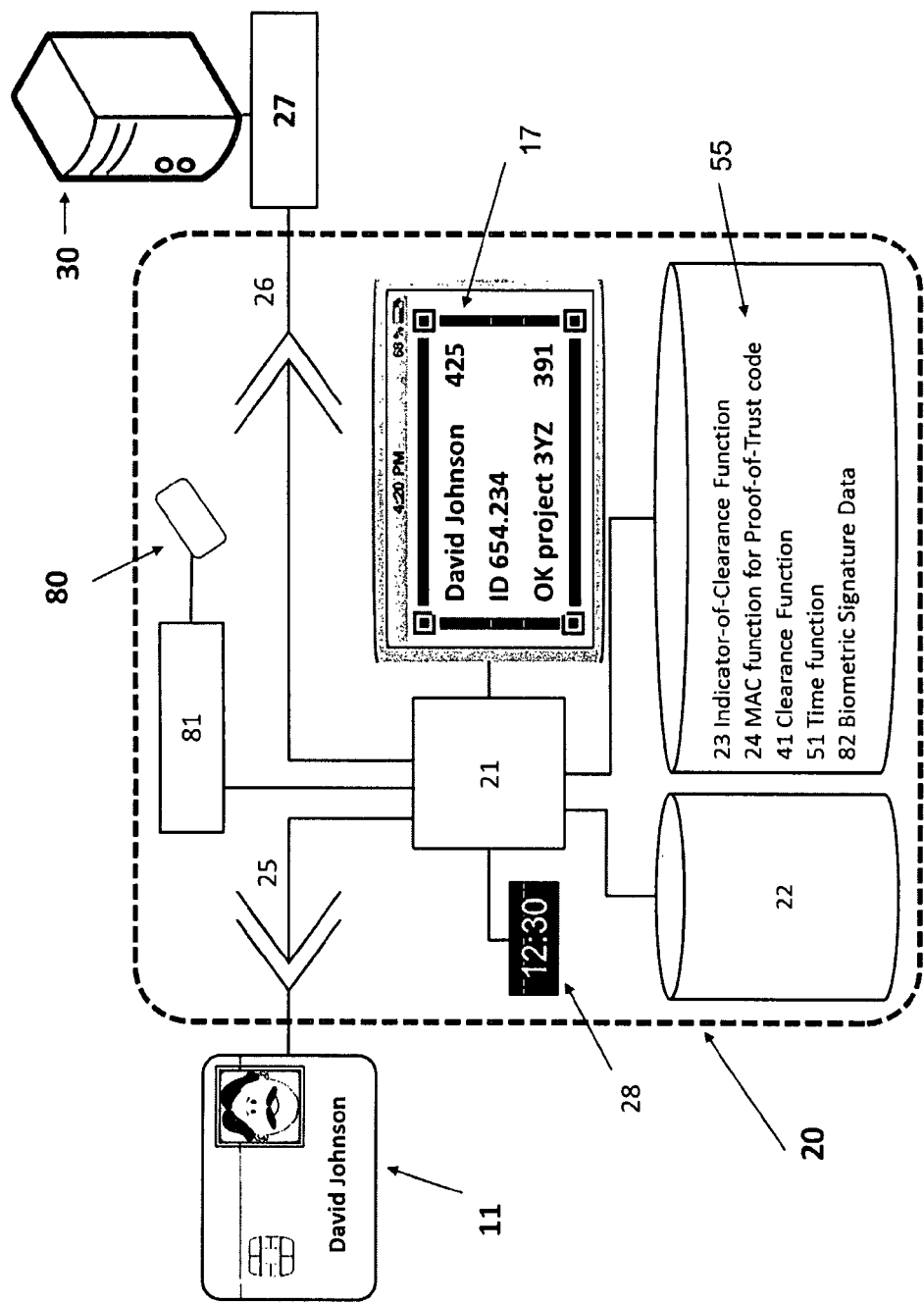
FIG. 9 similar to FIG. 2 presents a Validator Device according to FIG. 8 for the validation and thus also the authentication of the information stored in a Token.

As an additional protection against fraud, the Validator 20 may be equipped with a reader that may extract biometric information from a person or object to which the Validator 20 is attached, referred to hereinafter as the Biometric Reader 80. Such Validator is for example shown in FIG. 8 and shown in further detail in FIG. 9. The Validator 20 may also be equipped with a processing unit, referred to hereinafter as the Biometric Processing Unit 81, that can convert the biometric information generated by the Biometric Reader in to a signature code, referred to hereinafter as the Biometric Signature Data 82 (FIGS. 8 and 9). In this case, the Identification Data of a Token 11 would contain also Biometric Signature Data 82 of the Owner of the Token 11. This Biometric Signature Data 82 can serve as a reference number that identifies the Owner of the Token 11. Examples are, when the Owner is a person, the signature of the electrocardiogram or the fingerprint of this person or a pin-code only known to the Owner, or when the Owner is an object, the signature of the noise profile of the engine of the object, for example a car. During the Initialisation Phase, the Validator would then also obtain this Biometric Signature Data 82 from the Token 11 and for example store it in its encrypted database 55. During the Operational Phase, the Validator may then use its Biometric Reader 80 and its Biometric Processing Unit 81 to obtain relevant Biometric Signature Data 82 from the person or the object to which the Validator is attached. If the Biometric Signature Data 82 obtained from the Biometric Reader 80 matches with the Biometric Signature Data 82 obtained from the Token 11, the Validator 20 may conclude that the Validator 20 is attached or at least in the presence of, beyond reasonable doubt, to the correct person or object. The Validator 20 may then continue to execute the Operational Phase unchanged as specified. If the Biometric Signature Data 82 obtained from the Biometric Reader 80 does not match with the Biometric Signature Data 82 obtained from the Token 11, the Validator 20 may conclude that the Validator is not attached or is no longer attached, beyond reasonable doubt, to the correct person or object. The Validator 20 may then interrupt the Operational Phase as specified and instead display a message stating that the Validator 20 is not attached to the correct Owner of the Token 11.

Thanks to this Biometric Reader 80 within the Validator 20 it becomes practically impossible to use the Token 11 from an Owner and to use this Token 11 with a Validator 20 attached to a person or object different from the Owner. This feature makes it therefore possible to visually validate, beyond reasonable doubt, that a specific person or object (in addition to the Token 11 of this person or object) is authentic and/or has the proper authorizations to execute a task and/or reside in a specific location. Thanks to this feature, this embodiment of the invention makes it possible to provide a continuous, for example two-factor authentication of a person or an object during the entire Operational Phase, as the Validator will only authenticate the Owner if both the ownership factor (in this case the Token that the Owner must hold or the Identification Code that he needs to provide, if applicable) and the inherence factor (in this case a biometric feature, for example and if applicable different from the Identification Code) are verified by the Validator. This embodiment of the invention can be further enhanced to three-factor authentication, for example by requiring in addition a further Identification Code, for example a PIN code, from the Owner of the Token during the Initialisation Phase as an additional prerequisite to enable the Validator to become and stay active in the Operational Phase.

An example of a Validator 20 with a Biometric Reader 80, is a Validator 20 that may be equipped with a reader that can record the electrocardiogram of the person that wears the Validator 20. The Token 11 of this person is then linked to a memory that contains the digital signature of the electrocardiogram of the person. This digital signature was recorded from the person when the Trust Authority created the Token 11 for this person. When the Validator 20 is then activated with the Token 11 of the Owner in the Initialisation Phase, the Validator 20 may verify that the Token has the correct Clearance Status 46 and, if yes, may then obtain the Biometric Signature Data 82 from the Token 11. Next, the Validator 20 may use its Biometric Reader 80 to obtain the electrocardiogram from the person who is wearing the Validator 20 and compare the Digital Signature Data 82 from this electrocardiogram with the Digital Signature Data obtained from the Token 11. If equal, the Validator may then execute the Operational Phase or remain in the Operational Phase with the correct IoC and preferably also the correct PoT, applicable. If not, the Validator may for example only display an error message.

Another example is a Validator that may contain a biometric reader for fingerprints. In this case, the Token may contain the digital signature of the fingerprint of the Owner of the Token. The wearer of the Validator may then be asked to record his fingerprint during the Operational Phase on the Biometric Reader 80 of his Validator 20, for example every 30 minutes. If the registered fingerprint matches the fingerprint from the Owner of the Token, the Validator may continue to execute the Operational Phase, otherwise it may for example only display an error message.

The invention claimed is:

1. A Proof-of-Trust-System, comprising a first Identification Device and a second Identification Device, each of the first and second Identification Devices comprising:

a Token comprising a memory storing information of a person or object, such information comprising Identification Data comprising a first subset representing security Clearance Data used to indicate that the person or object is allowed to perform a valid action or obtain a valid status, said Identification Data being arranged to uniquely identify the person or object; and, a Validator comprising a display, a processor unit, a Validator clock and Validator communication interface configured to interact with the Token and with a Connector of a Centralized System remote from the Devices and configured to securely transfer data during an Initialization Phase between the Centralized System and the Validator through the Connector, such data comprising a clock synchronization signal to synchronize the Validator clock to a Centralized system clock of the Centralized System, and Clearance Rules specifying whether the Token, based on the Clearance Data stored in the Token, can be given a specific Clearance Status that indicates that the object or person is allowed to perform an action or obtain a valid status;

wherein the display is further adapted to display, during an Operational Phase, a first security code, referred to as the Indicator-of-Clearance (IoC) code, indicating the Clearance Status of the Token, whereby the first security code is generated by an Indicator-of-Clearance Function, such as a digital signature or hash function, programmed on the processor unit based on the Clearance Status and the Validator Clock, wherein the data being securely transferred during the Initialization Phase between the centralized system and the Validator comprises a set of Time Rules, said Time Rules causing the processor unit to calculate, by a Time Function programmed on the processor, a set of time intervals, referred to as Set-of-Time-Points, said Set-of-Time-Points being provided as input to the Indicator-of-Clearance Function such that respective Indicator-of-Clearance codes are generated for each of the time intervals, wherein the respective Indicator-of-Clearance codes for the first and second Identification Devices are identical and displayed simultaneously on the respective displays of the first and second Identification Devices associated with respective Tokens that are authentic and have the same valid Clearance Status, wherein the processor unit of each Validator is adapted so that each potential Indicator-of-Clearance code has a corresponding uniquely different visible element to be displayed on the display of the Validator prior to or concurrently with showing the new corresponding Indicator-of-Clearance code, wherein the visible element changes over time, and wherein the displayed visible element is identical for all Validators so that the same visible element is displayed in a synchronous manner on all Validators of Tokens with the same valid Clearance Status.

2. A Proof-of-Trust-System according to claim 1, wherein the Time Rules further define a time limit period at which the Operational Phase ends and the Validator stops generating Indicator-of-Clearance codes until a new Initialisation Phase occurs.

3. A Proof-of-Trust-System according to claim 1, wherein the visible element includes an Animated Indicator-of-Clearance Transition codified in a database of Animated Indicator-of-Clearance Transitions in the Validator.

4. A Proof-of-Trust-System according to claim 1, wherein the data being transferred during the Initialisation Phase between the Centralized System and the Validator comprises a set of Indicator Rules used as additional input by the Indicator-of-Clearance function to generate the Indicator-of-Clearance code.

5. A Proof-of-Trust-System according to claim 1, wherein the Validator further comprises a memory for storing the Clearance Rules and when present Time Rules and Indicator Rules.

6. A Proof-of-Trust-System according to claim 1, wherein the Validator communication means used during the Initialisation Phase comprises exclusively wired communication means.

7. A Proof-of-Trust-System according to claim 1, wherein the Token and the Validator are integrated into a single device.

8. A Proof-of-Trust-System according to claim 1, wherein the Validator comprises an input device configured to receive further security information on the Owner of the Token and wherein the Validator is provided to compare the security information received via the input device with further security information from the Token on the Owner of the Token.

9. A Proof-of-Trust-System according to claim 8, wherein the further security information comprises biometric signature or knowledge data on the Owner of the Token and wherein the input device comprises a Biometric Reader for obtaining biometric signature or knowledge data from the carrier of the Identification Device.

10. A Proof-of-Trust-System according to claim 1, wherein some or all of the parts of the Proof-of-Trust-System, the Identification Device and/or the Centralized System are tamper resistant.

11. A Proof-of-Trust-System according to claim 1, wherein the data transferred between the Centralized System and the Validator is encrypted-through an end-to-end secure messaging channel.

12. A Proof-of-Trust-System according to claim 1, further comprising a Reference Device having a display and being connected to the Centralised System, the Reference Device being configured to display the IoC code of a Set-of-Valid-Tokens with a predefined Time Delay.

13. A Proof-of-Trust System according to claim 1, wherein the visible element includes coloured blocks or symbols.

14. A Proof-of-Trust System according to claim 13, wherein the coloured blocks or symbols move over the display of the Validator.

15. A Proof-of-Trust System according to claim 1, wherein the visible element is indicated by one or more light sources.

16. A Proof-of-Trust System according to claim 1, wherein the one or more light sources includes one or more coloured diodes or light emitting diodes.

17. A Proof-of-Trust System according to claim 1, wherein the one or more diodes or light emitting diodes are provided to flash.

18. A method for validating information displayed on the first or second Identification Devices according to claim 1, comprising the steps of:

initializing the Validator during the Initialization Phase, the initializing comprising the steps of:

presenting a Token containing information of a person or object to the Validator, such information comprising Identification Data comprising a first subset representing Clearance Data, which Identification Data uniquely identifies the person or object;

connecting the Token to the Validator through the Validator communication interface, thereby allowing the Validator to access the information stored in the memory of the Token;

connecting the Validator to a Connector of a Centralized System through the Validator communication interface; and transferring data between the Validator and the Centralized System through the Connector, such data comprising a clock synchronization signal to synchronize the Validator clock to a Centralized system clock of the Centralized System, and Clearance Rules specifying whether the Token, based on the Clearance Data stored in the Token can be given a specific Clearance Status that indicates that the object or person is allowed to perform a valid action or obtain a valid status;

the method further comprising the step of:

operating the Validator during an Operational Phase for validating the information in a Token, the operating the Validator during the Operational Phase comprising the step of: generating a first security code, referred to as the Indicator-of-Clearance code, indicating the Clearance Status of the Token, whereby the first security code is generated by an Indicator-of-Clearance Function programmed on the processor unit based on the Clearance Status and the Validator Clock, wherein the processor unit of each Validator is configured so that each potential Indicator-of-Clearance code has a corresponding uniquely different visible element to be displayed on the display of the Validator prior to or concurrently with showing the new corresponding Indicator-of-Clearance code, wherein the visible element changes over time, and wherein the displayed visible element is identical for all Validators so that the same visible element is displayed in a synchronous manner on all Validators that are connected to the Centralized System and that are associated with Tokens with the same valid Clearance Status.

19. The method according to claim 18, wherein the visible element includes an Animated Indicator-of-Clearance Transition codified in a database of Animated Indicator-of-Clearance Transitions in the Validator.

20. The method according to claim 18, wherein the data being transferred during the Initialisation Phase between the Centralized System and the Validator comprises a set of Indicator Rules used as additional input by the Indicator-of-Clearance function to generate the Indicator-of-Clearance code.

21. The method according to claim 18, wherein the data being transferred during the Initialisation Phase between the centralized system and the Validator comprises a set of Time Rules, the processor unit, enabled by the Time Rules, calculating by a Time Function programmed on the processor, a set of time intervals, referred to as Set-of-Time-Points, said Set-of-Time-Points being provided as input to the Indicator-of-Clearance Function such that respective Indicator-of-Clearance codes are generated for each of the time intervals.

22. A system for validating one or more identification tokens, comprising:
- a first token including first identification data and a second token including second identification data;
- a first validator device and a second validator device, each of the first and second validator devices including a display, a processor unit, a validator clock, and one or more communication interfaces;
- each of the respective one or more communication interfaces of the first and second validator devices being configured to (a) receive, from a centralized clock of a centralize system remote from the first and second validator devices, a respective clock synchronization signal to synchronize the validator clock to the respective centralized system clock, (b) receive, from the centralized system, clearance rules specifying whether the respective first and second tokens can be granted a clearance status indicating that a person or object with which the respective first and second validator devices is associated is allowed to perform an action or to obtain a valid status, and (c) access identification data from the respective first and second tokens to apply the clearance rules to determine whether to grant a clearance status to the person or object with which the respective first and second validator devices is associated based on the accessed identification data;
- the processor unit of the first validator device being programmed to generate a security code of the first validator device by a programmed function having a substantially unpredictable output based on the granted clearance status associated with the first token and a time point from the synchronized validator clock of the first validator device;
- the processor unit of the second validator device being programmed to generate a security code of the second validator device, by the same programmed function producing the same unpredictable output as the programmed function executed by the processor unit of the first validator device, based on the granted clearance status associated with the second token and the same time point from the synchronized validator clock of the second validator device;
- wherein each of the respective displays of the first and second validator devices synchronously displays the same security code as a visible element based on the unpredictable output from the programmed function in response to the first validator having granted a clearance status to the first token that is equal to the clearance status granted by the second validator to the second token, and wherein the processor unit of each of the validator devices is adapted so that each potential security code has a corresponding uniquely different visible element to be displayed on each of the respective displays prior to or concurrently with showing a new security code, wherein the visible element changes over time.

23. The system of claim 22, wherein the first token is merged with the first validator device to form a first identification device, and wherein the second token is merged with the second validator device to form a second identification device.

24. The system of claim 22, wherein the identification data includes clearance data.

* * * * *